(12) United States Patent
Yamada

(10) Patent No.: US 8,793,832 B2
(45) Date of Patent: Aug. 5, 2014

(54) CLEANING SHEET

(75) Inventor: Kikuo Yamada, Tokyo (JP)

(73) Assignee: Kikuo Yamada, Tokyo (JP)

( * ) Notice: Subject to any disclaimer, the term of this patent is extended or adjusted under 35 U.S.C. 154(b) by 275 days.

(21) Appl. No.: 13/526,344

(22) Filed: Jun. 18, 2012

(65) Prior Publication Data

US 2012/0311803 A1 Dec. 13, 2012

Related U.S. Application Data

(63) Continuation-in-part of application No. 12/003,525, filed on Dec. 28, 2007, now Pat. No. 8,225,453.

(51) Int. Cl.
| | |
|---|---|
| *A47L 13/12* | (2006.01) |
| *A47L 13/20* | (2006.01) |
| *B32B 5/02* | (2006.01) |
| *A47L 13/46* | (2006.01) |
| *B32B 7/12* | (2006.01) |
| *B32B 27/12* | (2006.01) |
| *A47L 13/255* | (2006.01) |
| *B32B 29/02* | (2006.01) |
| *A47L 13/44* | (2006.01) |
| *B32B 7/04* | (2006.01) |
| *B32B 5/12* | (2006.01) |
| *A47L 13/38* | (2006.01) |

(52) U.S. Cl.
CPC ............. *B32B 5/022* (2013.01); *B32B 2262/08* (2013.01); *B32B 5/024* (2013.01); *A47L 13/46* (2013.01); *B32B 7/12* (2013.01); *B32B 2262/0284* (2013.01); *B32B 2262/0253* (2013.01); *B32B 27/12* (2013.01); *B32B 2262/062* (2013.01); *A47L 13/255* (2013.01); *B32B 29/02* (2013.01); *B32B 2432/00* (2013.01); *A47L 13/44* (2013.01); *B32B 2250/20* (2013.01); *B32B 7/045* (2013.01); *B32B 5/12* (2013.01); *A47L 13/38* (2013.01); *B32B 2262/0246* (2013.01); *B32B 2262/0261* (2013.01)
USPC .......................... 15/229.1; 15/209.1; 15/229.3

(58) Field of Classification Search
USPC ................................... 15/209.1, 229.1–229.4
See application file for complete search history.

(56) References Cited

U.S. PATENT DOCUMENTS

| | | | |
|---|---|---|---|
| 7,237,296 | B2 | 7/2007 | Tanaka et al. |
| 7,712,178 | B2 | 5/2010 | Yamada |

FOREIGN PATENT DOCUMENTS

| | | |
|---|---|---|
| JP | U-S11-13085 | 9/1936 |
| JP | A-7-250711 | 3/1995 |
| JP | U-3031008 | 8/1996 |
| JP | A-09-149873 | 6/1997 |
| JP | A-11-276402 | 12/1999 |
| JP | A-2000-245670 | 9/2000 |
| JP | A-2001-299657 | 10/2001 |
| JP | A-2004-33238 | 5/2004 |

*Primary Examiner* — Shay Karls
(74) *Attorney, Agent, or Firm* — Oliff PLC

(57) ABSTRACT

Provided is a cleaning sheet in which a plurality of fiber bound materials produced by bundling a plurality of fibers is joined on a base sheet, and at least two adjacent bound fiber materials have respectively different length in the longitudinal direction of the fibers and different density, to constitute a cleaning portion and which can sufficiently wipe off even relatively large dirt particles.

38 Claims, 23 Drawing Sheets

CLEANING SHEET

This is a Continuation-in-Part of application Ser. No. 12/003,525 filed Dec. 28, 2007. The prior application, including the specification, drawings and abstract, is incorporated herein by reference in its entirety.

BACKGROUND OF THE INVENTION

1. Field of the Invention

The present invention relates to a cleaning sheet.

2. Description of the Related Art

Dusters are conventionally known as cleaning tools to remove dust or dirt stuck to furniture such as wardrobes, electric appliances such as personal computers and lights, walls inside buildings, thresholds, head jamb (kamoi), and the like. However, dusters are simply used to beat dirt or the like out of matter to be cleaned and thus are insufficient to wipe dirt or the like there from.

Japanese Patent Application Laid-Open (JP-A) No. 2000-295670 is referred, which proposes that a long fiber filament is intermittently jointed onto the surface of a substrate sheet in its fiber flow direction, the long fiber filament is cut at its joint portions, and many different brushes are formed on at least one surface of the substrate sheet to produce a cleaning sheet, so that dirt or the like is wiped from matter to be cleaned by use of the cleaning sheet.

However, according to the cleaning sheet of JP-A-2000-245670, a brush portion is formed by cutting of a long fiber filament spread on an unwoven cloth. For this reason, the fiber crinkles during its cutting and also the length of the fiber constituting the brush portion naturally has a limit. Dirt twined and taken out by the fiber is limited to comparatively small sizes and it is difficult to twine and take off relatively large dirt particles by means of fiber of the brush portion. Additionally, when cleaning is carried out using such a cleaning sheet, usually the cleaning sheet is moved while making contact with the face to be cleaned of a material to be cleaned. Therefore, dirt rarely contacts the central portion of the cleaning sheet, thereby posing a problem in that it is impossible for the central portion of a cleaning sheet to also have a function of wiping dirt off to thoroughly use the entire face of the cleaning sheet.

SUMMARY OF THE INVENTION

In light of the above problem, an object of the present invention is to provide a cleaning sheet that can sufficiently wipe off even relatively large dirt particles.

The subject matters of the present invention are as follows. (1) A cleaning sheet is comprised of a base sheet, and a plurality of fiber bound materials formed by bundling a lot of fibers, wherein the plurality of fiber bound materials is placed to arrange side by side and joined onto at least one surface of the base sheet to constitute a cleaning portion. (2) A cleaning sheet is comprised of a base sheet, and a plurality of fiber bound materials being disposed side-by-side in a plurality of rows and fixed on the base sheet, wherein at least adjacent two fiber bound materials having different length in the longitudinal direction of a fiber thereof each other.

In the present invention, a cleaning portion provided with fiber bound materials is provided on a base sheet to constitutes a cleaning sheet. Accordingly, fibers constituting fiber bound materials of the cleaning portion can sufficiently twine and take out relatively large dust and dirt particles (particulate matter) and effectively scratch dust and dirt so as to exhibit capture and maintenance performance. In addition, the cleaning sheet is provided with a fiber bound material different from a base sheet on the base sheet. Thus, it is possible to comparatively freely adjust the lengths of fibers and also tightly capture relatively large dirt particles.

The present invention can arrange and place a plurality of fiber bound materials on a base sheet and bind thereto to constitute a cleaning portion, thereby being capable of twining and taking out still more dirt particles.

In the present invention, the cleaning portion can be provided with a substrate sheet, so that the substrate sheet can twine and take out fine pieces of dirt.

In the present invention, the cleaning portion may be formed by binding plural kinds of fiber bound materials having different fiber lengths to a base sheet. This constitution makes it possible to twine and take out fine pieces of dirt with fiber bound materials having fibers of short lengths and to twine and take out relatively large dirt particles with fiber bound materials having fibers of long lengths.

According to the present invention, the cleaning portion may be formed by binding it to a base sheet in such a manner that portions of the fiber bound materials are overlapped with each other, and doing so enables a bulky cleaning portion. Thus, cushion properties of a cleaning sheet can be increased, so that the cleaning portion can be more sufficiently fitted to the cleaning face of material to be cleaned, thereby effectively twining and taking out dirt.

DESCRIPTION OF THE PREFERRED EMBODIMENTS

Figure 1:
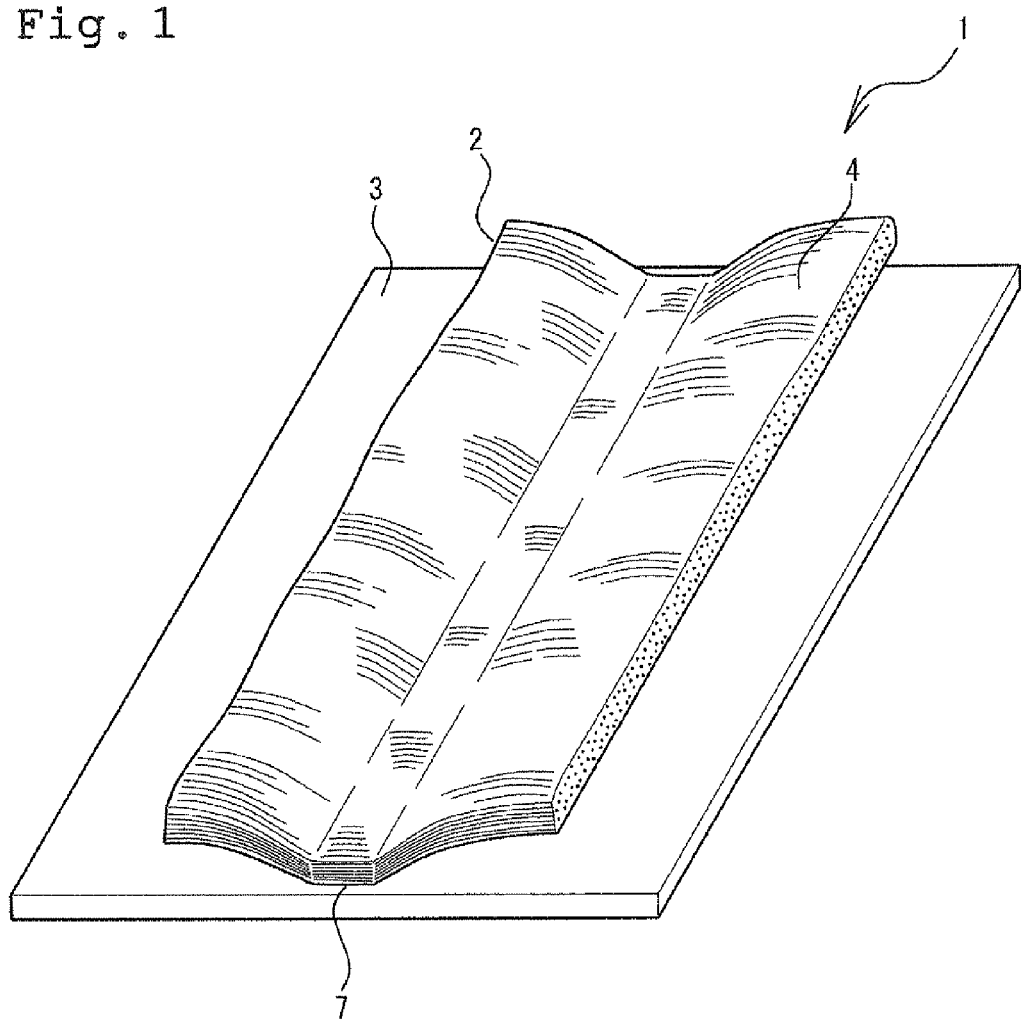
FIG. 1 is a perspective view for depicting a first embodiment in which a cleaning sheet of the present invention includes one fiber bound material.

A cleaning sheet 1 of the present invention is configured such that a fiber bound material 4 is provided on a base sheet 3 to form a cleaning portion 2 in a first embodiment (FIG. 1). The fiber bound material 4 is formed in a sheet fashion by bundling of a large number of fibers. For this fiber bound material 4, a material produced by correcting each of the fibers constituting the fiber bound material to an extent without scattering can be used. In the fiber bound material 4, fibers may be partially bound, as required, to each other by fusion, adhesion, or the like.

Figure 14:
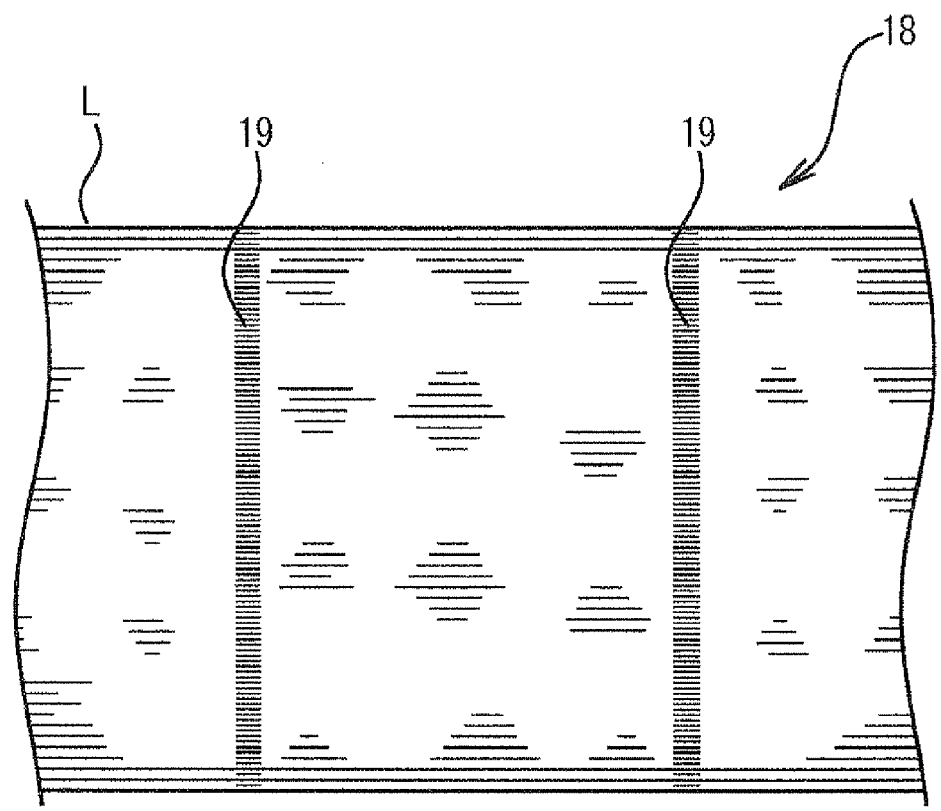
FIG. 14 is a plan view for depicting a fiber bound material in a cleaning sheet of the present invention.

The fiber bound material 4 can be specifically obtained, as shown in FIG. 14, by the following method, for example. A large number of continuous fibers L are aligned and bound to obtain long fiber bound materials 18. The long fiber bound materials 18 are bound in a sheet-like form to each other at intervals (at appropriate intervals) in a direction intersecting the flow, direction of the long fibers (e.g., a direction perpendicular to the longitudinal direction of the long fibers) to form a long fiber binding portion 19. Then, an intermediate portion between the long fiber binding portions 19 is cut to form the fiber bound materials 4.

Available examples of the fibers constituting the fiber bound material 4 include natural fibers such as cotton and wool, synthetic fibers such as polyethylene, polypropylene, polyethylene terephthalate, nylon and polyacryl, and conjugated fibers such as core-sheath fibers, sea-island fibers and side-by-side fibers. When fibers are partially heat fused and bound to each other, a core-sheath conjugated fiber in which the core is made from polypropylene and the sheath is made from polyethylene, is preferred because the core-sheath conjugated fiber has both excellent heat fusion properties of polyethylene constituting the sheath and sturdiness of polypropylene constituting the core. A fiber constituting the fiber bound material 4 preferably has a thickness of from about 0.01 mm to about 0.3 mm since the fiber bound material can appropriately twine and take out dirt. In addition, the fiber bound material 4 may be constituted by, for example, same material fibers, a same thickness, and a same color, or by two or more different kinds of the above matters.

The fiber bound material 4 may be used that is bent in the flow direction of the fibers constituting the material. The fiber bound material 4 in which the bent portion is formed by bending in such a manner can be specifically achieved, for example, by taking an axis in the direction perpendicular to the flow direction of the fibers constituting the fiber bound material 4 and, at the same time substantially, at the central position of the fiber bound material 4, and bending the fiber bound material 4 around the axis and in the fiber flow direction, and setting the portion thus bent as a bent portion.

In the cleaning sheet 1, the fiber bound material 4 is bound to the base sheet 3 to form the cleaning portion 2. During binding, a fixing portion 7 is formed at a binding position of the fiber bound material 4 and the base sheet 3. This fixing portion 7 is formed in a linear fashion in a direction intersecting the flow direction (longitudinal direction) of the fibers constituting the fiber bound material 4. In addition, the binding can also be carried out by affixing both the fiber bound material 4 and the base sheet 3 by use of an adhesive, or by directly affixing both the fiber bound material 4 and the base sheet 3 by heat fusion.

Upon the formation of the cleaning portion 2, in the case where the fiber bound material 4 is disposed onto the base sheet 3 by adhesion using an adhesive, the adhesives that can be used include two part curing adhesives, thermoplastic resin adhesives, elastomer adhesives, thermosetting resin adhesives, instant adhesives, and hot melt adhesives. From the viewpoint of being capable of rapid adhesion operation by heating and cooling, a hot melt adhesive is preferred. From the viewpoint of being capable of obtaining a thick adhesion layer well permeable to fibers, a solution-type or emulsion-type thermoplastic resin adhesive or elastomer adhesive is preferred. Of the base sheet 3 and the fiber bound material 4, the sides of adhesive coating in advance may be either of them or both of them.

The cleaning portion 2 may be disposed by arranging a plurality of the fiber bound materials 4 on the base sheet 3 and formed by binding each of the fiber bound materials 4 to the base sheet 3.

Figure 2:
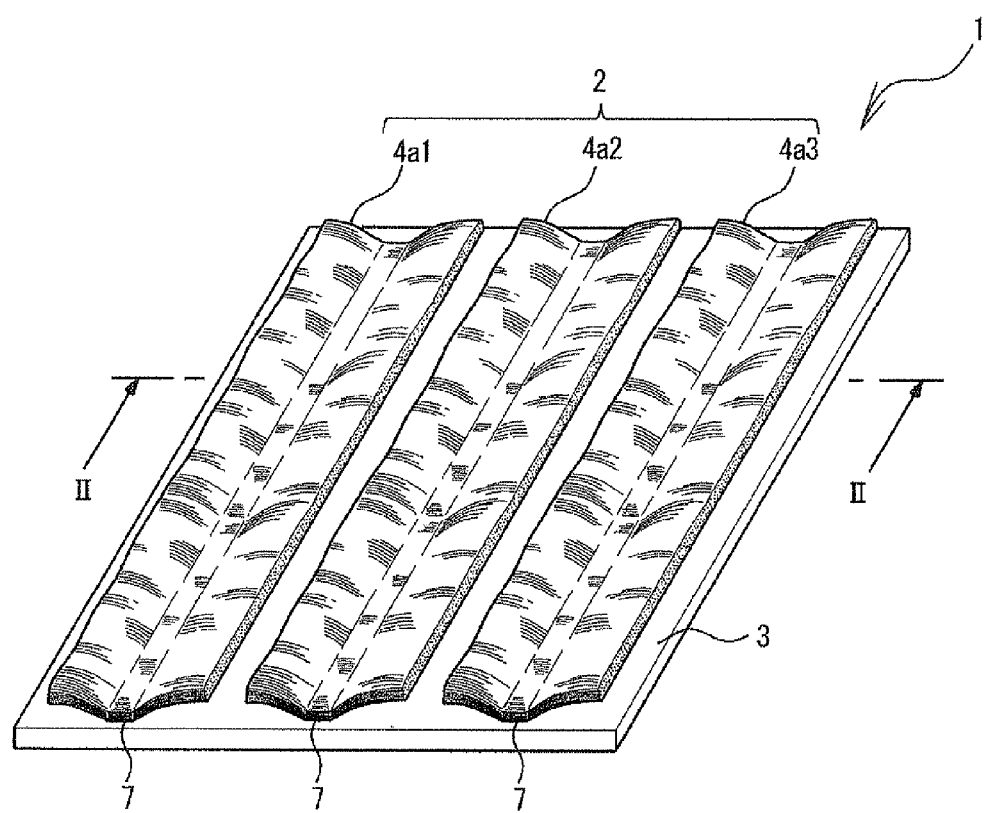
FIG. 2 is a perspective view for depicting a second embodiment in which a cleaning sheet of the present invention includes a plurality of fiber bound materials.
Figure 3:
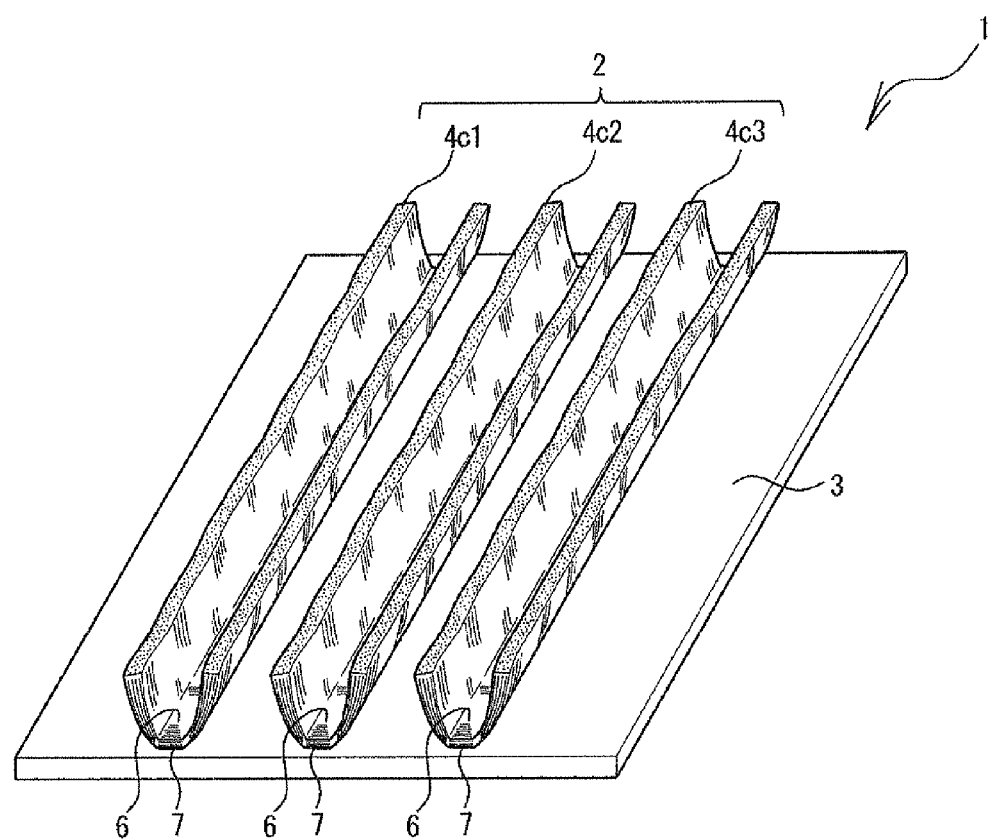
FIG. 3 is a perspective view for depicting a third embodiment in which a bent portion is formed in a fiber bound material in a cleaning sheet of the present invention.
Figure 4A:
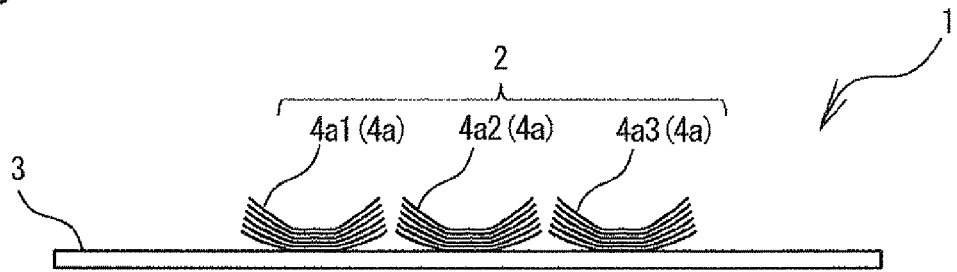
FIG. 4A is a sectional view taken along II-II line in FIG. 2.

For example, in the cleaning sheet 1 of a second embodiment of the present invention, as shown in FIGS. 2 and 4A, the fiber bound materials 4a which include fiber bound materials 4a1, 4a2, 4a3 provided a bent portion respectively, may be disposed on the same side of a surface of the base sheet 3 in a plurality of numbers rows thereof. In this case, in the cleaning sheet 1, the plurality of fiber bound materials 4a which include the fiber bound materials 4a1, 4a2, 4a3 is aligned and disposed at intervals in the flow, i.e. longitudinal direction of the fibers constituting the fiber bound materials 4.

Where the plurality of fiber bound materials 4 are disposed on the base sheet 3, the fiber bound materials which are provided with the bent portions may be used for a part or all of the plurality of fiber bound materials 4. For example, with regard to the cleaning sheet 1 of a third embodiment, as shown in FIG. 3, the three fiber bound materials 4 are joined or fixed to the base sheet 3, and all of them may be the fiber bound materials 4, 4a1, 4a2, 4a3 which are respectively provided with the bent portion 6. In this case, the plurality of fiber bound materials 4 is joined to the base sheet 3 at their bent area to define bent portion 6 and also to form fixing portions 7, thereby forming the cleaning portion 2.

In the case where the fiber bound materials 4 of the base sheet 3 are disposed in a plurality of numbers, the disposition number of the fiber bound materials 4 disposed on the base sheet 3 is not particularly limited and usually two to ten materials are preferred.

Where the fiber bound materials 4 are disposed on the base sheet 3 in a plurality of numbers in the cleaning sheet 1, plural kinds of the fiber bound materials 4 different in lengths, densities (densities of fibers), kinds of fibers (material) constituting the fiber bound materials 4, and the like may be disposed on the base sheet 3.

Where the fiber bound materials 4 are disposed on the base sheet 3 in a plurality of numbers, the fiber bound materials 4 different in length of fibers may be disposed on the base sheet 3 of a fourth embodiment, as shown in FIGS. 4A, 4C, 4D and 5. At this time, the fiber bound materials 4 can be placed in arbitrary positions.

Figure 4B:
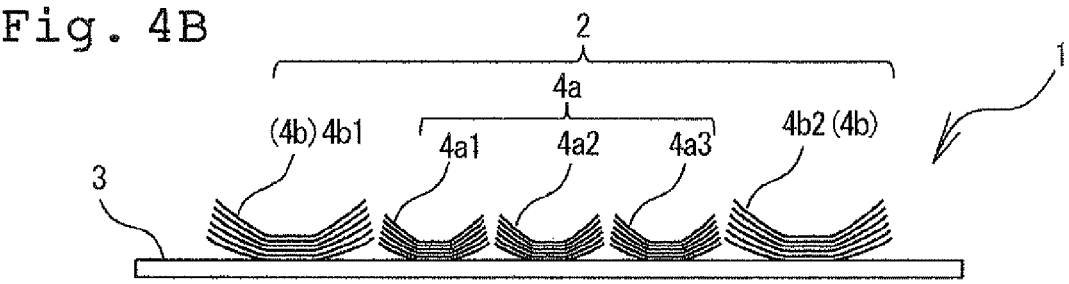
FIG. 4B is a sectional view for depicting a fourth embodiment in which a cleaning sheet of the present invention includes a plurality of fiber bound materials.

For example, as shown in FIG. 4B, the fiber bound materials may be placed on the base sheet 3 in such a way that fiber bound materials 4a (4a1, 4a2, 4a3) having short fiber lengths are in proximity to the central position of the base sheet 3 rather than fiber bound materials 4b (4b1, 4b2, 4b3) having long fiber lengths and each may be bound to the base sheet 3.

Figure 4C:
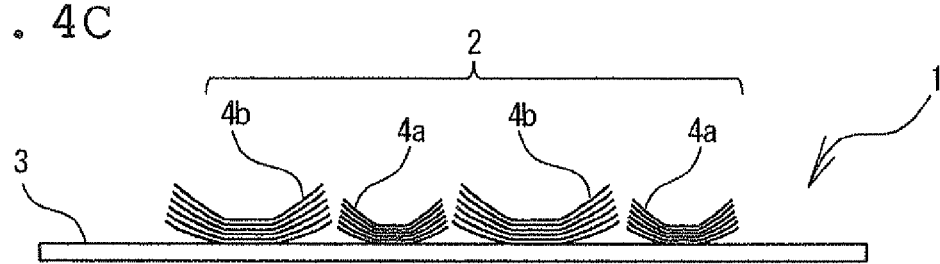
FIG. 4C is a sectional view for depicting a fifth embodiment in which a cleaning sheet of the present invention includes a plurality of fiber bound materials.
Figure 4D:
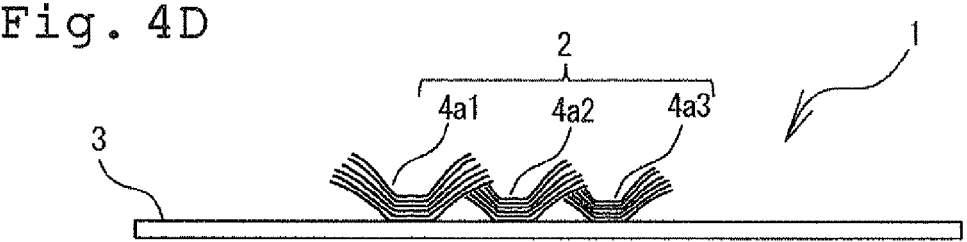
FIG. 4D is a sectional view for depicting a sixth embodiment in which a cleaning sheet of the present invention includes a plurality of fiber bound materials.

As shown in FIG. 4C, the fiber bound materials 4a, 4b may be alternately disposed at intervals, each binding to the base sheet 3.

Figure 5:
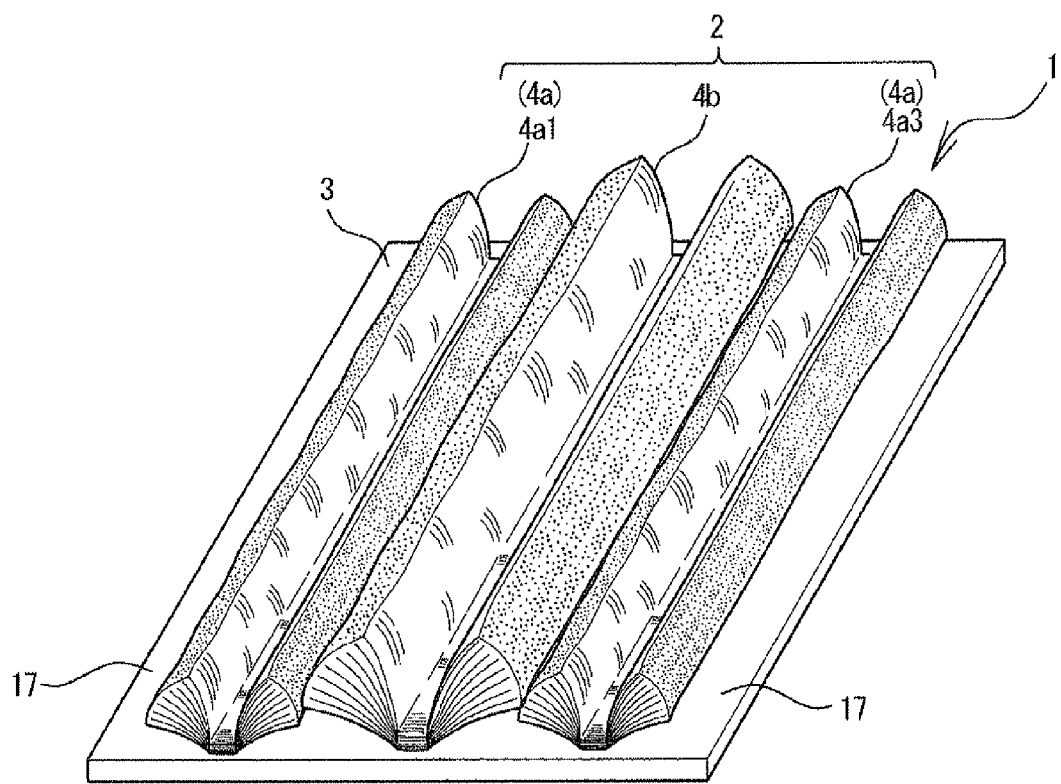
FIG. 5 is a perspective view for depicting a seventh embodiment in which a cleaning sheet of the present invention includes plural kinds of fiber bound materials having different lengths of fibers.

In the case where the fiber bound materials 4 are placed on the base sheet 3, the fiber bound materials 4a (4a1, 4a3), 4b having fibers of different lengths to each other may be disposed on the base sheet 3, as shown in FIG. 5. In this case, the fiber bound materials 4a (4a1, 4a3) having fibers of short lengths and the fiber bound materials 4 having fibers of lengths longer than those are preferably disposed such that the fiber bound material 4b is aligned in a position closer to the central position of the base sheet 3 (the distance to the central position of the base sheet 3 is shorter) than the fiber bound materials 4a1, 4a3.

Figure 15:
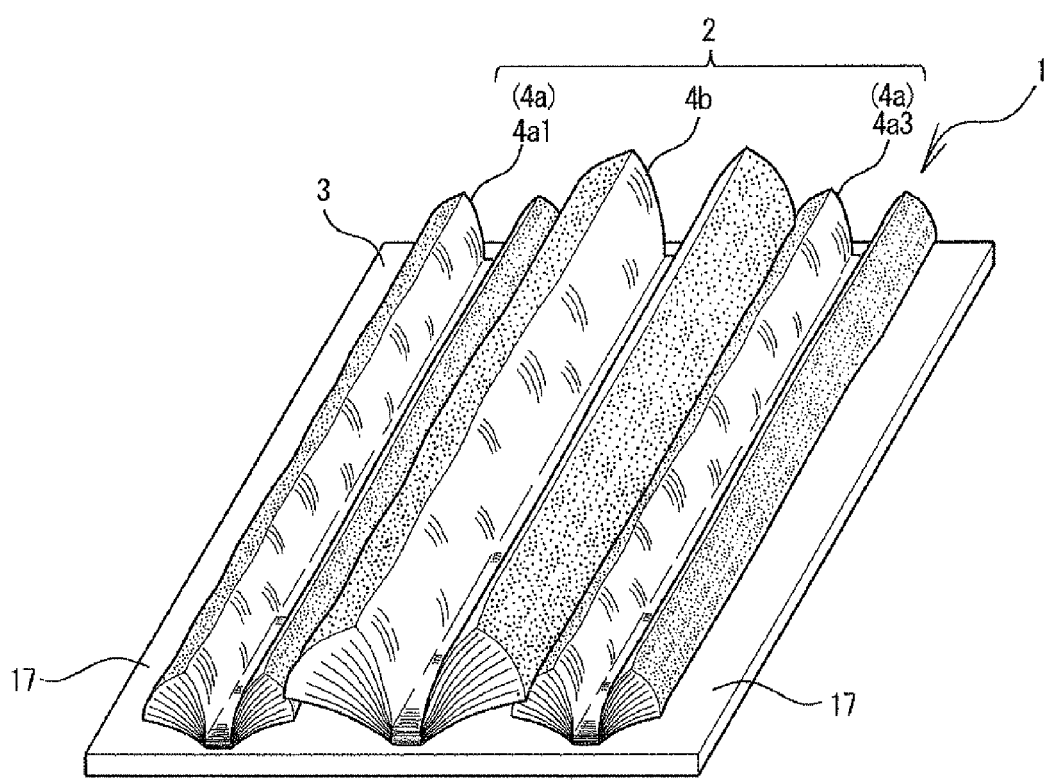
FIG. 15 is a perspective view for depicting an embodiment similar to the embodiment shown in FIG. 5.

As shown in FIGS. 5 and 15, a length of a movable portion extending from the fixing portion 7 or a bound portion to a free end of one of sets of plural fiber bound materials 4 is different from a length of a movable portion extending from the bound portion to a free end of another of the sets of plural fiber bound materials disposed adjacently to the one of the sets of plural fiber bound materials, and the free ends of the movable portions of the adjacently disposed sets of fiber bound materials partially overlap each other.

In the cleaning sheet 1, as the plurality of fiber bound materials 4 aligned on the base sheet 3 are disposed close to the central position of the base sheet 3, the length of the fibers constituting the fiber bound materials 4 becomes long. As such, according to the cleaning sheet 1, relatively large dirt particles that are not twined and taken out by the fiber bound material 4a are effectively twined and taken out by means of the fibers constituting the fiber bound material 4b disposed in a position in proximity to the central position of the base sheet 3. According to the cleaning sheet 1, fine dirt particles can be effectively twined and taken out by the fiber bound material 4a disposed in a position where the separation distance from the central position of the base sheet 3 is long, and relatively large dirt particles can be effectively twined and taken out by the fiber bound material 4b disposed in a position where the separation distance to the central position of the base sheet 3 is short. For this reason, all the plurality of fiber bound materials 4 disposed in the base sheet 3 can perform the function of thoroughly twining and taking out dirt.

In the case where the fiber bound materials 4 are disposed on the base sheet 3, the fiber bound materials 4 having fine fibers and the fiber bound materials 4 having fibers thicker than those may be employed. In this case, strong and thick fibers serve to take off dirt and fine fibers serve to take in the dirt taken off, and thus can sufficiently twine and take out fine dirt particles to relatively large dirt particles, resulting in effective cleaning. Here, the fine fibers preferably have diameters of from 0.01 mm to 0.05 mm. Additionally, the thick fibers may be thicker than the above fine fibers and preferably have diameters of from 0.06 mm to 0.3 mm.

Moreover, in the case where the fiber bound materials 4 are disposed on the base sheet 3, the fiber bound materials 4 having a low degree of concentration of fibers and the fiber bound materials 4 having fibers the degree of concentration of which is higher than that above may be used. In this case, the fiber bound materials 4 having a high degree of concentration of fibers rather than the fiber bound materials 9 having a low degree of concentration of fibers are preferably aligned and disposed in a position in proximity to the central position of the base sheet 3. Moreover, in the cleaning sheet 1, it can increase the degree of concentration of the fibers of the fiber bound materials 4 disposed in a position where the separation distance from the central position of the base sheet 3 is short, which enables making the fiber bound materials 4 bulky. Consequently, in the cleaning sheet 1, the fiber bound materials 4 disposed in a position where the separation distance from the central position of the base sheet 3 is long as well as the fiber bound materials 4 disposed in a position where the separation distance from the central position of the base sheet 3 is short can also make contact with dirt thoroughly, whereby all the fiber bound materials 4 can serve to twine and take out dirt.

Furthermore, in the case where the fiber bound materials 4 are disposed on the base sheet 3, the neighboring interval between the fiber bound materials 4 (i.e., the distance therebetween) is not particularly limited. Thus, as shown in FIG. 4O, the fiber bound materials may be bound to the base sheet in such a manner that some of the neighboring fiber bound materials 4 (4a1, 4a2, 4a3) are overlapped with each other. In this case, the overlap of the fiber bound materials 4 can make the cleaning portion 2 bulky, so that the cleaning sheet 1 excellent in cushion properties during cleaning can be formed.

Such a plurality of fiber bound materials 4 may be disposed on both sides or only one side of the base sheet 3. In the case where the plurality of fiber bound materials 4 are disposed on both sides of the base sheet 3, the fiber bound materials 4 can be disposed in an arbitrary position and the cleaning portions 2 can be formed on both the sides.

Figure 6A:
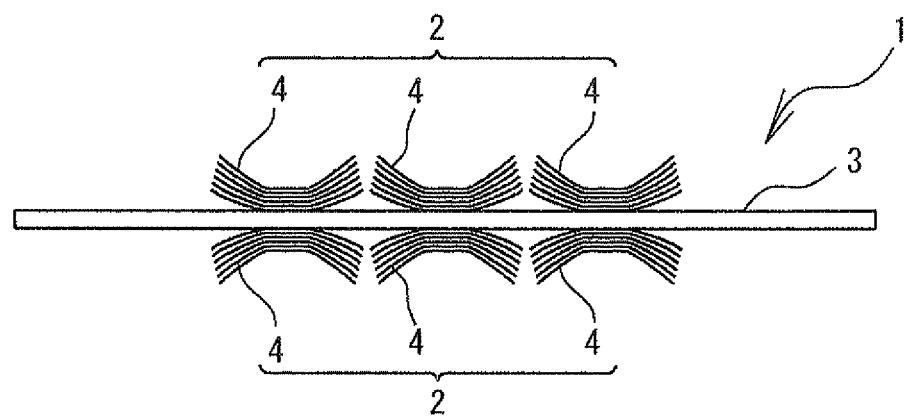
FIG. 6A is a sectional view for depicting an eighth embodiment in which fiber bound materials are disposed on both sides of a base sheet in a cleaning sheet of the present invention.
Figure 6B:
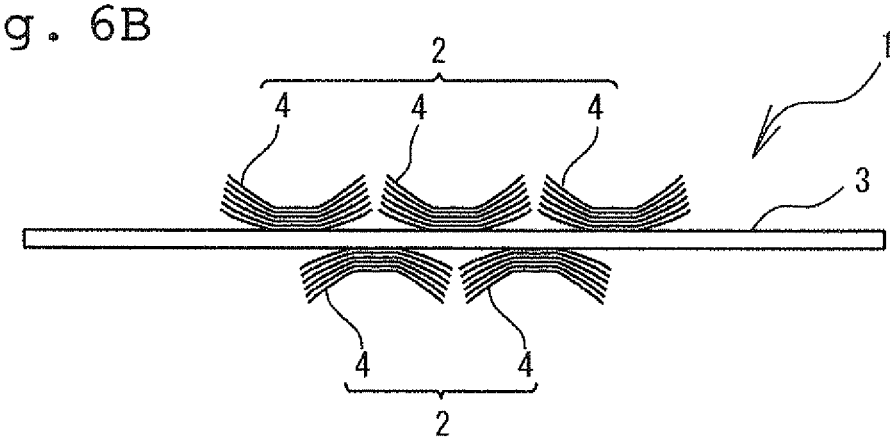
FIG. 6B is a sectional view for depicting a ninth embodiment in which fiber bound materials are disposed on both sides of a base sheet in a cleaning sheet of the present invention.

Therefore, for example, the fiber bound materials 4 placed in different sides to each other may sandwich the base sheet 3 and be disposed in positions where the fiber bound materials lie one up another as shown in an eighth embodiment (FIG. 6A), or the fiber bound materials 4 may be placed in positions at intervals in the flow direction of the fibers each constituting the fiber bound materials 4 that sandwich the base sheet 3 as shown in a ninth embodiment of present invention (FIG. 6B).

In this manner, when the cleaning portion 2 is disposed on both the sides of the base sheet 3 in the cleaning sheet 1, both the sides of the cleaning sheet 1 can be used for cleaning. Furthermore, when the handle or frame provided with the cleaning sheet 1 is used as a cleaning tool, the cleaning portion 2 formed on one side (first face) of the base sheet 3 makes contact with the handle or frame and the cleaning portion 2 formed on the other side (second face) of the base sheet 3 makes contact with a matter to be cleaned. Upon implementation of cleaning, even though a few lips and dips are present on the handle or frame, the cleaning portion 2 of the first face in contact with them can serve as a cushion to cover the lips and dips, thereby enabling sufficient contact between the cleaning portion 2 on the second face and the matter to be cleaned.

Figure 16:
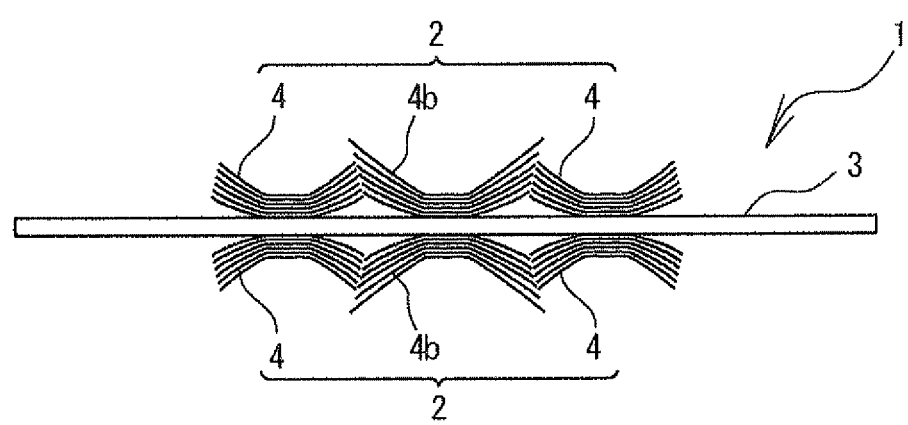
FIG. 16 is a sectional view for depicting an embodiment similar to the embodiment shown in FIG. 6A.
Figure 17:
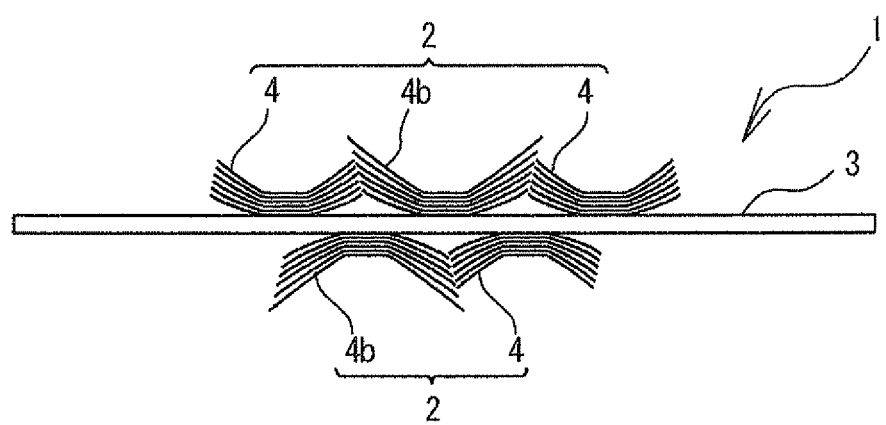
FIG. 17 is a sectional view for depicting an embodiment similar to the embodiment shown in FIG. 6B.

As shown in FIGS. 16 and 17, a length of a movable portion extending from the fixing portion as well or a bound portion to a free end of one of sets of plural fiber bound materials 4 is different from a length of a movable portion extending from the bound portion to a free end of another of the sets of plural fiber bound materials disposed adjacently to the one of the sets of plural fiber bound materials, and the free ends of the movable portions of the adjacently disposed sets of fiber bound materials partially overlap each other.

Figure 8A:
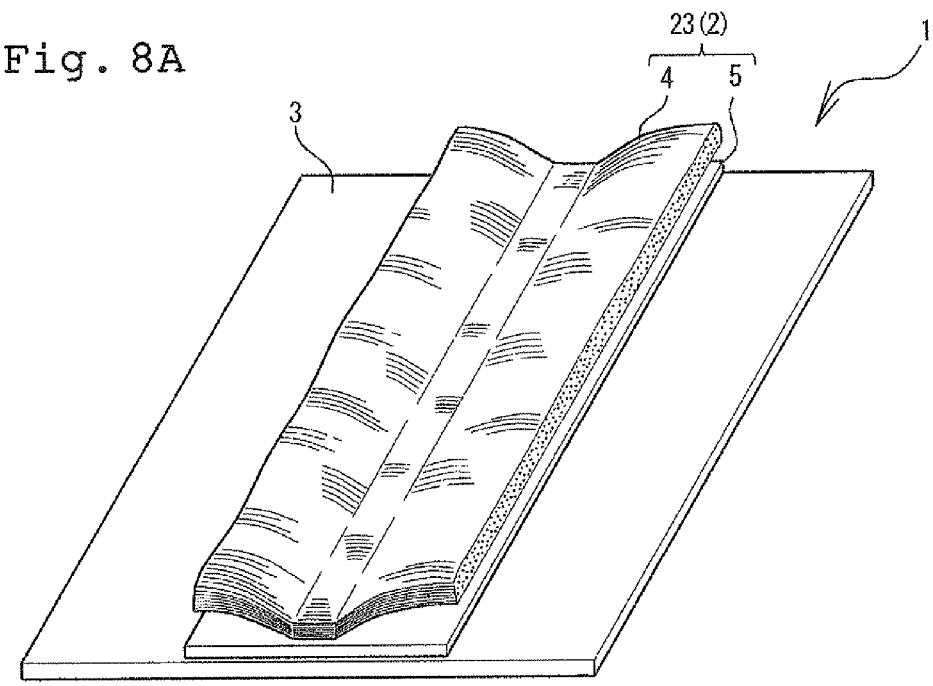
FIG. 8A is a perspective view for depicting an eleventh embodiment in which a substrate sheet is interposed between a fiber bound material and a base sheet in a cleaning sheet of the present invention.

The cleaning portion 2 may be formed by interposing a substrate sheet 5 between the fiber bound material 9 and the base sheet 3 as shown in an eleventh embodiment (FIG. 8A).

The substrate sheet 5 is not particularly limited so long as it is attachable to both the fiber bound material 4 and the base sheet 3; a sheet similar to one usable for the above-mentioned base sheet 3 can be used as appropriate.

In the cleaning portion 2, the fiber bound material 9 and the substrate sheet 5 may be bound by adhesion with an adhesive, or bound by heat fusion. An adhesive similar to one usable for the adhesion between the above mentioned base sheet 3 and the fiber bound material 4 can be used as appropriate.

Upon the formation of the cleaning portion 2, the substrate sheet 5 is disposed on the substrate sheet 5 in such a manner that the substrate sheet 5 is interposed between the fiber bound material 4 and the base sheet 3. Alternatively, the substrate sheet 5 and the base sheet 3 may be bound with each other by adhesion with an adhesive or by heat fusion. As the adhesive, an adhesive similar to an adhesive usable for the adhesion between the above mentioned base sheet 3 and the fiber bound material 4 can be used as appropriate.

Upon the formation of the cleaning portion 2, a joint segment 23 produced by binding the fiber bound material 4 to the substrate sheet 5 is obtained by the following method, for example. The method involves aligning a lot of continuous fibers in a sheet fashion on the surface of a long sheet made of the same material as the substrate sheet 5 in the longitudinal direction of the long sheet to form a long fiber laminated sheet, binding the long fiber laminated sheet at appropriate intervals in a direction intersecting the flow direction of the fibers (e.g., a direction perpendicular to the longitudinal direction of the fiber) to form a bound portion, and then cutting an intermediate portion between the bound portions. The joint segment 23 is disposed on the base sheet 3 to form the cleaning portion 2 (FIG. 8A).

Figure 8B:
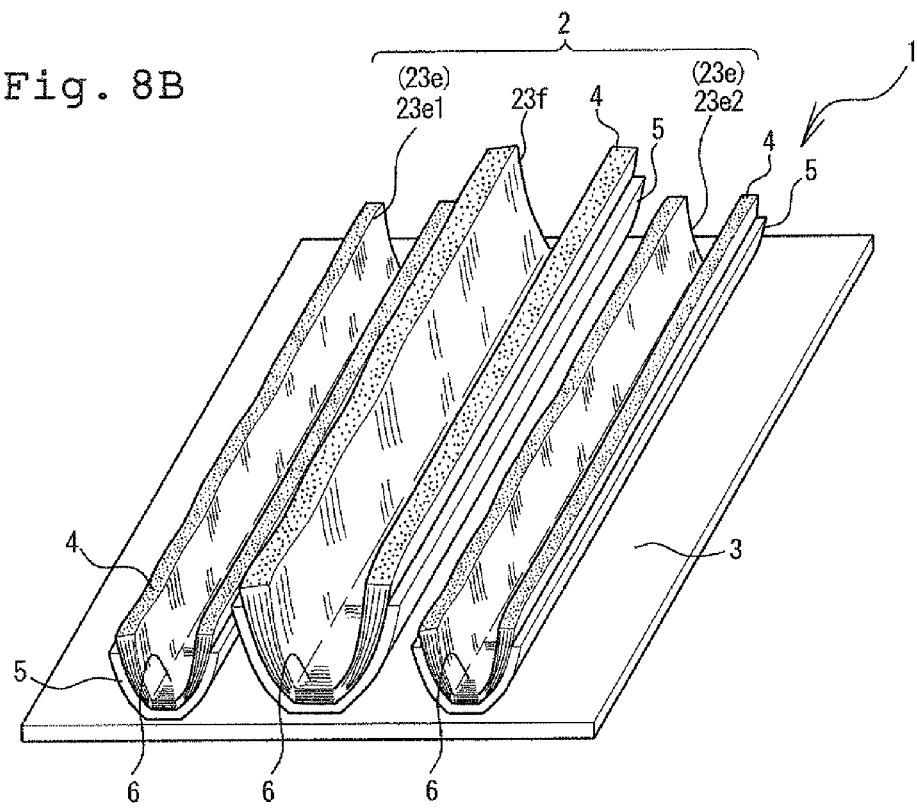
FIG. 8B is a perspective view for depicting a twelfth embodiment in which a substrate sheet is interposed between a fiber bound material and a base sheet in a cleaning sheet of the present invention.

The cleaning portion 2 may be formed by disposing on the base sheet 3 a segment produced by overlaying the fiber bound material 4 on the substrate sheet 5 as well as bending both the fiber bound material 4 and the substrate sheet 5 in a state in which the fiber bound material 4 is directed toward the inside in the flow direction of the fibers constituting the fiber bound material 4 (e.g., joint segments 23e, 23f of a twelfth embodiment in FIG. 8B). For example, the cleaning portion 2 can be specifically formed as follows. The fiber bound material 4 is overlaid on the substrate sheet 5. Further, taking as an axis the direction perpendicular to the flow direction of the fibers in the fiber bound material 4 and substantially the central position of the fiber bound material 4, the fiber bound material 4 and the substrate sheet 5 are bent around the axis in a state in which the fiber bound material 4 is directed toward the inside. The bent portion is defined as the bent portion 6. The fiber bound material 4 and the substrate sheet 5 are bonded and integrated to the base sheet 3 on the bent portion 6. According to the cleaning sheet 1, the substrate sheet 5 as well as the fiber bound material 4 is also bent, so that dirt can be not only twined and taken out by the fibers constituting the fiber bound material 4, but also made contact with the substrate sheet 5 to thereby twine and take out dirt on the substrate sheet 5, efficiently being capable of wiping dirt off.

The case is not limited to a case as shown in FIG. 8A where in the cleaning sheet 1 one fiber bound material 4 is disposed on the base sheet 3 to form the cleaning portion 2. In the cleaning sheet 1, a case where a plurality of fiber bound materials 4 are bound onto the base sheet 3, or a case where the fiber bound materials 4 are disposed on both the sides of the base sheet 3, or a case where the substrate sheet 5 is provided between the fiber bound material 4 and the substrate sheet 5 to form the cleaning portion 2 may be allowable. In other words, for example, with the fiber bound materials 4a1, 4a2, 4a3, 4b, 4c1, 4c2, 4c3 in the cleaning sheet 1 as shown in FIGS. 2, 3 and 5, the substrate sheet 5 may be interposed.

In the cleaning sheet 1, joint segments in which both the fiber bound material 4 and the substrate sheet 5 are bent to form a bent portion may be disposed on one side or both sides of the base sheet 3 in a single number or in a plurality of numbers to constitute a cleaning sheet. At this time, in the cleaning sheet 1, for example as shown in FIG. 8B, plural kinds of the joint segments 23e (23e1, 23e2), 23f constituting the fiber bound material 4 and having fibers of different lengths are preferably disposed. According to this cleaning sheet 1, the substrate sheet 5 is interposed between the adjacent fiber bound materials 4, which enables to further decrease the possibility of twining of the fibers themselves constituting the fiber bound material 4. In addition, according to the cleaning sheet 1, the substrate sheet 5 as well as the fibers constituting the fiber bound material 4 can wipe dust and dirt off, whereby cleaning can be effectively carried out.

In the case where the fiber bound materials 4 are disposed in the cleaning sheet 1, some of the plurality of fiber bound materials 4 may be provided with the substrate sheet 5.

The base sheet 3 in the present invention is the thin base of the cleaning sheet 1, and is a flexibly changeable sheet for holding the cleaning portion 2. The base sheet 3 generally has a thickness of 1 mm or less and an external shape of a rectangle, but is not limited thereto. For example, the shapes of the base sheet 3 can include a circle, oblong, and ellipse.

The material of the base sheet 3 is not particularly limited so long as the fiber bound material 4 can be bound to form the cleaning portion 2. The materials that can be suitably used include paper, cloth, synthetic resin, and unwoven cloth. Of these, unwoven cloth is particularly suitably used from the viewpoints of lightweight properties, strength, endurance and adhesion properties.

Available examples of unwoven cloth include spun lace unwoven cloth, spunbond unwoven cloth, thermal bond unwoven cloth, air-through unwoven cloth, point bond unwoven cloth, and the like. Of these, spunbond unwoven cloth and thermal bond unwoven cloth are preferred. The fibers constituting unwoven cloth that may be usable include natural fibers, synthetic fibers and conjugated fibers. Unwoven cloth preferably weighs from about 20 to about 100 g/m$^2$.

For the base sheet 3 may be used a sheet (not shown) in which a large number of fibers are laminated on one side of an unwoven cloth strip in a sheet fashion and unwoven cloth and a bundle of fibers are bound in a linear fashion in a substantially central position of the flow direction of fibers constituting a bundle of sheet-like fibers as well as the unwoven cloth strip and the bundle of the fibers are intermittently in a point-like fashion in a position between both the edges of the unwoven cloth strip parallel to the region bound in the linear fashion. In the case where the cleaning portion 2 is formed on the base sheet 3 to construct a cleaning sheet, the cleaning portion 2 is formed on the face on which a bundle of fibers is laminated, in the base sheet 3. Then, it is possible for the cleaning sheet 1 not only to wipe dust and dirt off with the cleaning portion 2, but also to wipe dust and dirt off even with a bundle of fibers laminated on the base sheet 3. This enables to further effectively wipe dust and dirt off.

A sheet produced by overlaying a plurality of unwoven cloth fragments, sheets or the like as described above (called a sheet-overlaid material) may be used as the base sheet 3.

Figure 7:
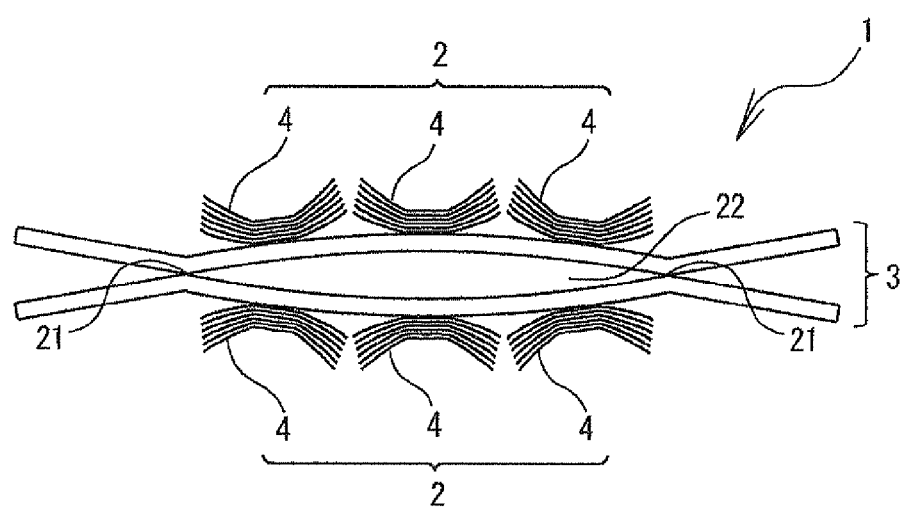
FIG. 7 is a sectional view for depicting a tenth embodiment of the cleaning sheet of the present invention.

In the case where the base sheet 3 is a sheet-overlaid material, the cleaning portion 2 may be formed on both the surfaces of the base sheet 3 to form the cleaning sheet 1 as shown in a tenth embodiment (FIG. 7). According to this cleaning sheet 1, a handle or knob is inserted into a space portion 22 generated by bonding sheet-overlaid materials to form a joint portion 21. Thus, a cleaning tool having a plurality of cleaning faces can be formed.

In addition, the cleaning sheet 1 as shown in FIG. 7 can also be obtained by bonding two of the cleaning sheets 1 shown in FIG. 2 with each other, with the cleaning portions 2 directed outward, so as to form a joint portion 21.

Figure 18:
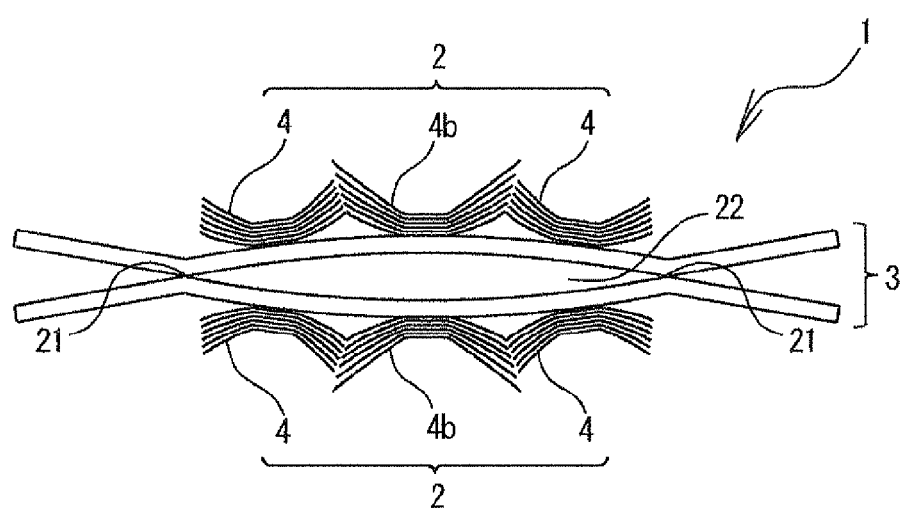
FIG. 18 is a sectional view for depicting an embodiment similar to the embodiment shown in FIG. 7.

As shown in FIG. 18, a length of a movable portion extending from the fixing portion or a bound portion to a free end of one of sets of plural fiber bound materials 4 is different from a length of a movable portion extending from the bound portion to a free end of another of the sets of plural fiber bound materials disposed adjacently to the one of the sets of plural fiber bound materials, and the free ends of the movable portions of the adjacently disposed sets of fiber bound materials partially overlap each other.

Next, a method of producing a cleaning sheet of the present invention will be set forth in detail by use of the cleaning sheet 1 shown in FIG. 3 as an example.

Figure 9:
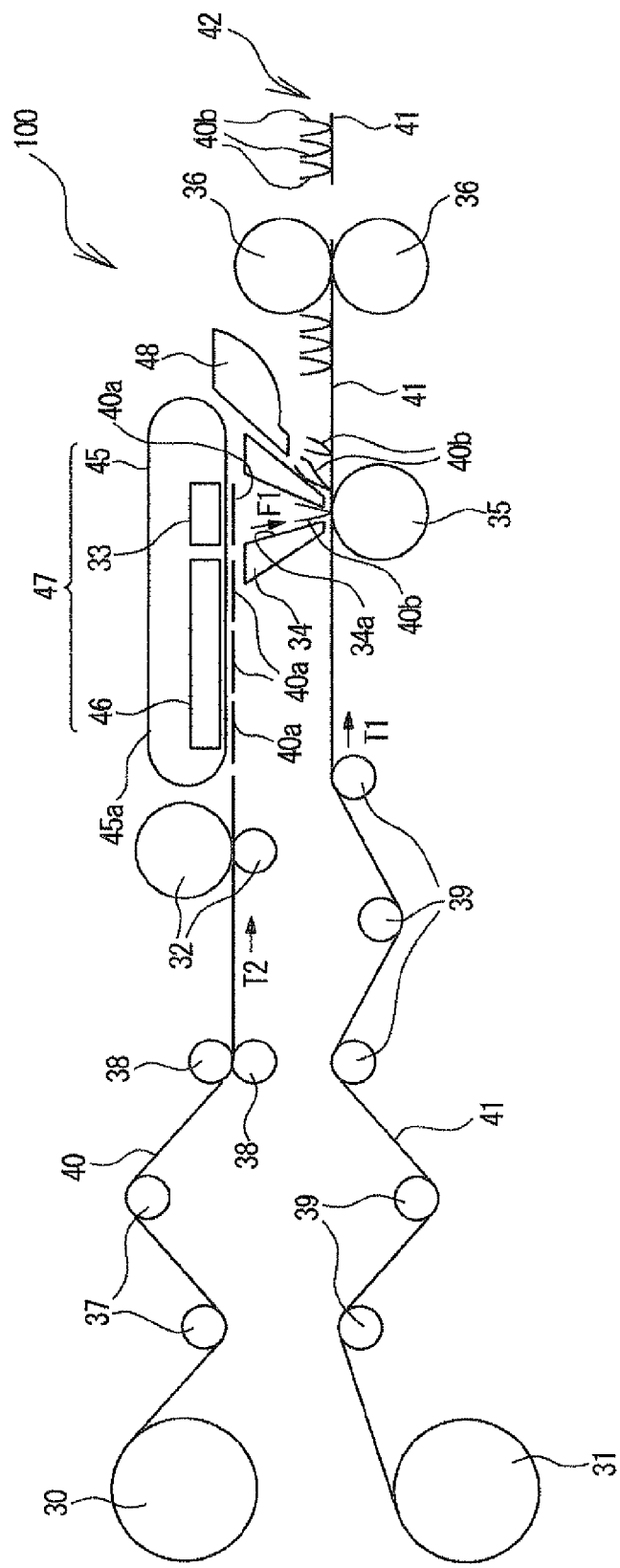
FIG. 9 is a schematic depicting diagram for depicting a manufacturing equipment for producing a cleaning sheet of the present invention.

FIG. 9 is a schematic explanatory diagram indicating one embodiment of a cleaning sheet manufacturing equipment for producing one cleaning sheet of the present invention.

A cleaning sheet manufacturing equipment 100 includes a sheet roll 31, a fiber roll 30, a delivering roll 39, delivering rolls 37, 38, a pair of upper and lower fiber cutting rolls 32 for cutting the fibers, a fiber bound materials delivering unit 47, a bending imparting unit 34, a heating roll 35, a vacuum unit 48, and a pair of upper and lower cutting rolls 36 for cutting base sheet. The sheet roll 31 has a long base sheet 41 rolled thereon, and the fiber roll 30 has a lot of long fibers (lengthy fibers) rolled thereon. The delivering roll 39 delivers the long base sheet 41 in the arrow T1 direction. The delivering rolls 37, 38 deliver a long fiber bound materials 40 obtained by bundling a large number of long fibers in a sheet-like fashion in the arrow T2 direction while producing the long fiber bundled body. The pair of upper and lower fiber cutting rolls 32 includes a cutting blade on the roll face for cutting the long fiber bound material 40 to form a long fiber bound material 40a. The fiber bound material delivering unit 47 delivers the long fiber bound material 40a. The bending imparting unit 34, which is disposed in a position confronting the fiber bound material 40a delivered by the fiber bound material delivering unit 47, imparts a bent portion to the fiber bound material 40a so as to form a fiber bent body 40b. The heating roll 35 fuses the base sheet 41 to the fiber bent body 40b by heat (heat fusing). The vacuum unit 48 sucks the fiber bent body 40b fused on the base sheet 41. The pair of upper and lower cutting rolls 36 includes on the roll face a cutting blade for cutting into a predetermined length the base sheet 41 having the fiber bent body 40b fused thereon.

The fiber bound material delivering unit 47 includes a net conveyor 45, a vacuum unit 46, and a blowing unit 33. The net conveyor 45 has a delivering belt 45a formed in a net-like fashion. The vacuum unit 46 is disposed in a position confronting the fiber bound material 40a by way of the delivering belt 45a. The blowing unit 33 is disposed side by side in a position in the arrow T2 direction relative to the vacuum unit 46.

The bending imparting unit 34 is formed open in the vertical direction to be hollow, and is formed in an inverse tapered shape in its outside. In addition, an inclination groove 34a inclined so as to be narrower toward the open bottom portion is formed in its inside. The state of inclination of the inclination groove 34a is set as appropriate depending on the degree of bending of the bending portion imparted to the fiber bound material 40a.

A cleaning sheet of the present invention is produced by use of the manufacturing equipment 100 as shown in the following.

First, the long base sheet 41 is delivered from the sheet roll 31 through the delivering roll 39 toward the arrow T1 direction. On the other hand, a large number of long fibers are delivered from the fiber roll 30 and the long fibers are bundled to form the sheet-like long fiber bound material 40. The long fiber bound material is delivered to the arrow T2 direction through the delivering rolls 37, 38 while keeping a sheet-like state, and is further cut in the direction intersecting the flow direction of the long fibers (e.g. a direction orthogonal to the longitudinal direction of the long fibers) at a predetermined length through the fiber cutting roll 32 by means of the cutting blade of the fiber cutting roll 32, thereby to form the fiber bound material 40a. At this time, the length of the arrow T2 direction of the fiber bound material 40a can be determined as appropriate by setting as appropriate the speed of delivering the long fiber bound material 40 in the arrow T2 direction, the roll diameter of the fiber cutting roll 32 and the setting number of cutting blades, or the like.

The fiber bound material 40a is delivered by the fiber bound material delivering unit 47. The delivery by the fiber bound material delivering unit 47 is carried out while the fiber bound material 40a is sucked onto the surface of the delivering belt 45a of the net conveyor 45 due to a suction force of the vacuum unit 46.

In the fiber bound material delivering unit 47, the blowing unit 33 is placed upward from a position confronting the opening portion of the top face of the bending imparting unit 34 via the delivering belt 45a. When the fiber bound material 40a is delivered to a position where the blowing unit 33 is disposed, it is pressed toward (blown against) the base sheet 41 in the arrow F1 direction by the air blown off from the blowing unit in the arrow F1 direction. At this time, the fiber bound material 40a is gotten into the inclination groove 34a of the bending imparting unit 34 and bent to form a bent portion, thereby producing the fiber bent body 40b. Then, the air blown off from the blowing unit 33 presses the bent portion of the fiber bent body 40b against the surface of the base sheet 41 from the opening of the bottom portion of the bending imparting unit 34. When the fiber bent body 40b is pressed against the base sheet 41, the fiber bent body 40b and the base sheet 41 are heat fused in a linear fashion in the direction intersecting the flow direction of the fibers of the fiber bent body 40b (the direction crossing the flow direction of the fibers) by the heating roll 35 disposed in a position confronting the opening position of the bottom portion of the bending imparting unit 34 and putting the base sheet 41 therebetween. Here, although the fiber bent body 40b pressed one by one against the base sheet 41 is fused one by one at appropriate intervals onto the base sheet 41, the interval can be determined as appropriate by setting as appropriate the delivering speed of the base sheet 41 in the arrow T1 direction.

The fiber bent body 40b fused on the base sheet 41 is delivered to the outside of the bending imparting unit 34 in arrow T2 direction integrally with the base sheet 41 delivered in the arrow T2 direction and at this time is sucked by the vacuum unit 48 placed in the arrow T2 direction relative to the bending imparting unit 34. In this case, the vacuum unit 48 sucks the fiber bent body 40b to an extent in which the fiber bent body 40b and the base sheet 41 are not separated in the vacuum unit 48. The suction by the vacuum unit 48 shortens the time spent in the interval between the base sheet 41 and the bending imparting unit 34.

At the same time when the fiber bent body 40b and the base sheet 41 are heat fused, a state is formed in which the fibers constituting the fiber bent body 40b are bound to each other. This provides a product in which a fiber bound material is bound to a long base sheet to constitute a cleaning portion.

In this manner, when a product is obtained in which a fiber bound material is bound to a long base sheet to constitute a cleaning portion, the product is passed through the cutting roll 36 and cut at an appropriate length to obtain a cleaning sheet 42.

In the method of producing a cleaning sheet by use of the manufacturing equipment 100, the fiber bent body 40b and the base sheet 41 are bound to each other by heat fusion, but is not limited thereto. The fiber bent body 40b may be bound to the base sheet 41 using an adhesive such as a hot melt adhesive. Adhesion of the fiber bent body 40b to the base sheet 41 by means of an adhesive can be specifically realized, for example, by affixing an adhesive such as a hot melt adhesive in advance to a position expected to be a binding portion to the fiber bent body 40b on the base sheet 41 before passing the base sheet 41 through the heating roll 35.

The manufacturing equipment 100 can not only be used for producing the cleaning sheet shown in FIG. 3, but also be applied to other embodiments as shown in FIGS. 1, 2, 4A to 8B.

For example, differently from a cleaning sheet produced by forming the bent portion 6 in the fiber bound material 9 of the cleaning portion 2 as shown in FIG. 3, a cleaning sheet having no bent portion 6 in the fiber bound material 9 can be specifically produced using as a manufacturing equipment a unit formed by removing the bending imparting unit 39 from the manufacturing equipment 100.

In a cleaning sheet shown in FIG. 4A to FIG. 4O, a fiber bound material having fibers of different lengths constituting a fiber bound material is disposed on a base sheet. The cleaning sheet can be specifically produced, for example, by changing as appropriate the setting position of a cutting blade on the roll face of the fiber cutting roll 32 in the cleaning equipment 100 to form plural kinds of the fiber bound materials 40a having fibers of different lengths and by binding them at appropriate intervals onto the base sheet 41.

A cleaning sheet produced by interposing the substrate sheet 5 between the fiber bound material 4 and the base sheet 3 as shown in FIG. 5 may be produced in the following configuration, for example. That is, the manufacturing equipment 100 may be configured such that a substrate sheet roll, which has a long sheet (long substrate sheet) with the same material as the substrate sheet 5 rolled thereon, is placed, and the long substrate sheet is delivered from the substrate sheet roll and made to pass through the delivering roll 38 from the lower side of the long fiber bound materials 40.

Use of such a constitution in the manufacturing equipment 100 causes the long fiber bound material 40 to be overlaid on a long substrate sheet to form a long fiber laminated sheet and causes the long fiber laminated sheet to be delivered to the arrow T2 direction to integrally cut the long substrate sheet and the long fiber bound material 40 by the fiber cutting roll 32. This makes it possible to make a substrate sheet from the long substrate sheet as well as to form a thing produced by overlaying the fiber bound material 40a on the substrate sheet. The product produced by overlaying the fiber bound material 40a on the substrate sheet is delivered by the net conveyer 45 and pressed against the base sheet 41 by the blowing unit 33, and further the substrate sheet and the fiber bound material 40a are integrally bent to form a bent portion. Then, the bent portion is pressed against the surface of the base sheet 41 by the blowing unit 33, and subsequently the fibers, the base sheet and the substrate sheet constituting the fiber bound material 40a are integrally fused. At this time, the fibers constituting the fiber bound material 40a are bound to each other and the fibers and the substrate sheet are also bound to form a joint segment. Furthermore, the substrate sheet and the base sheet are also bound to form a state in which a cleaning portion is constituted. In other words, a product is obtained in which the joint segment including the fiber bound material and the base sheet is bound to the base sheet 41 to constitute the cleaning portion.

In this manner, after the product in which the cleaning portion is formed on the base sheet is obtained, the product is cut to an appropriate length by the cutting roll 36 for cutting the base sheet to produce a cleaning sheet made by forming the cleaning portion on the base sheet.

Next, a cleaning tool using the cleaning sheet 1 will be set forth in more detail by way of example in which the cleaning sheet 1 indicated in FIG. 5 is used. In the cleaning sheet 1, a sheet attaching portion 17 is formed in a region (a region outside the region H) present outside a cleaning portion 2 forming region (a region of G-H in FIG. 10) and outside the flow direction of the fibers constituting the fiber bound material 4.

Figure 11:
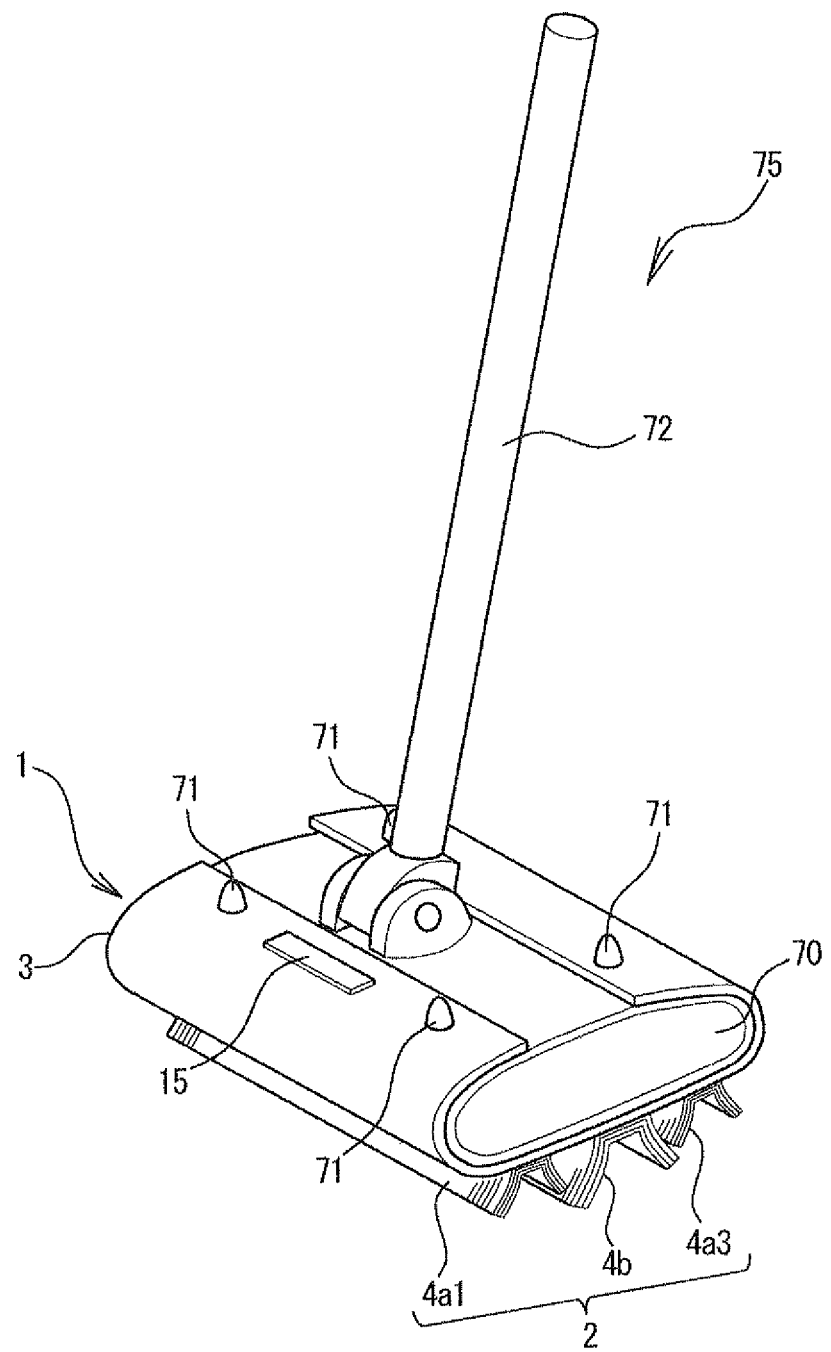
FIG. 11 is a perspective view for depicting a first embodiment of a first cleaning tool using a cleaning sheet of the present invention.

The cleaning sheet 1 in the cleaning sheet is attached on a frame 70 having a handle 72 attached thereto so as to form a floor cleaning mop 75 (referred to as a first embodiment of the cleaning tool) (FIG. 11).

Upon attaching the cleaning sheet 1 to the frame 70, the cleaning sheet 1 is fixed to the frame 70 and the sheet attaching portion 17 of the cleaning sheet 1 is bent to wind the sheet on the top face of the frame 70. A latch fragment 71 is disposed on the top face of the frame 70 and the cleaning sheet 1 is attached to the frame by latching using latch fragments on the top face of the frame 70 at four edges of the sheet attaching portion 17 to obtain the floor cleaning mop 75. The latch position in the cleaning sheet 1 using the latch fragment 71 is determined as appropriate by the setting position of the latch fragment 71 in the frame 70 and the size of the cleaning sheet 1.

Figure 10:
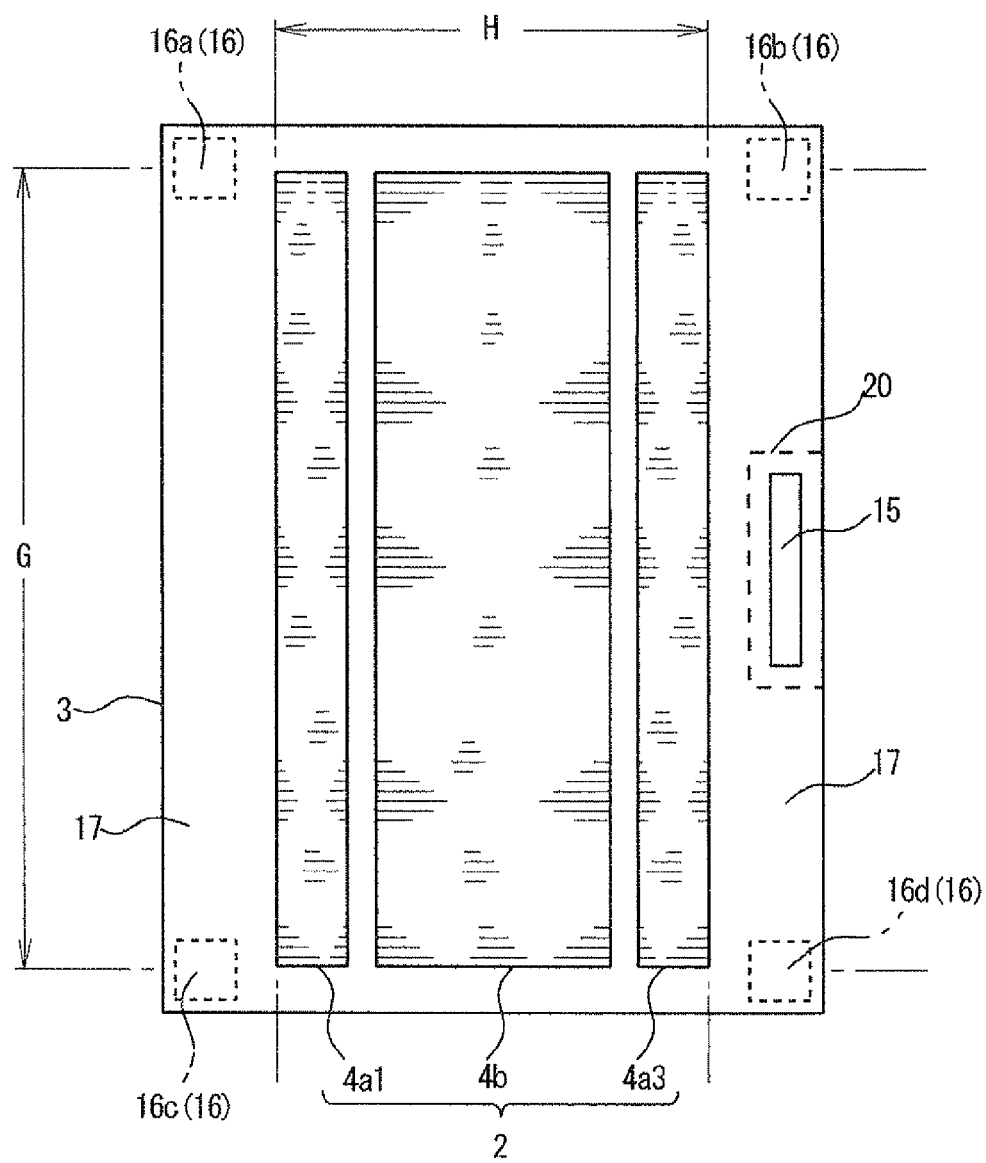
FIG. 10 is a plan view for depicting the embodiment in a cleaning sheet of the present invention.

As shown in FIGS. 10 and 11, an adhesion portion 15 may be formed at its sheet attaching portion 17 in the cleaning sheet 1 to be attached to the frame 70.

The adhesion portion 15 may be formed by adhesion of an adhesive-coated double coated tape to the cleaning sheet 1, or formed by applying an adhesive covered roller to the cleaning sheet 1 to apply the adhesive, or formed by spraying an adhesive with a sprayer.

The adhesive for used in the formation of the adhesion portion 15 can be selected as appropriate from substances having adhesiveness (i.e., adhesive substances) and specific illustrative examples can include hot melt adhesives, rubber adhesives, solvent adhesives, acrylic adhesives, and water-based adhesives.

Even where there are fine dust or dirt particles that cannot be wiped off with the cleaning portion 2, the cleaning sheet 1 can capture even such dust or dirt simply by pushing its adhesion portion 15 against the dust or dirt during cleaning.

The adhesion portion 15 is preferably covered with a releasing material such as releasing paper. If the adhesion portion 15 is covered with releasing paper in advance, the releasing paper is removed as required to expose the adhesion portion 15 so as to take dirt off.

In the cleaning sheet 1 of the present invention, intermittent cuts (perforations 20) around the region in which the adhesion portion 15 is disposed may be perforated. In this case, the adhesion portion 15 is as required cut into fine trips and taken off or the like from the cleaning sheet 1 using the perforations 20 formed in the cleaning sheet 1, which enables to readily cut the adhesion portion off.

In the cleaning sheet 1, as shown in FIG. 10, a fixing portion forming portions 16 (16a, 16b, 16c, 16d) may be formed in the region outside the cleaning portion 2 forming region (the region G-H in FIG. 10) present on the back face of the face on which the cleaning portion 2 is formed among the faces of the base sheet 3. In this case, the fixing portion forming portions 16 (16a, 16b, 16c, 16d) are preferably disposed in positions close to the four corners of the base sheet 3 and not overlapped with the positions latching with the latch fragment 71 in the cleaning sheet 1.

Figure 12:
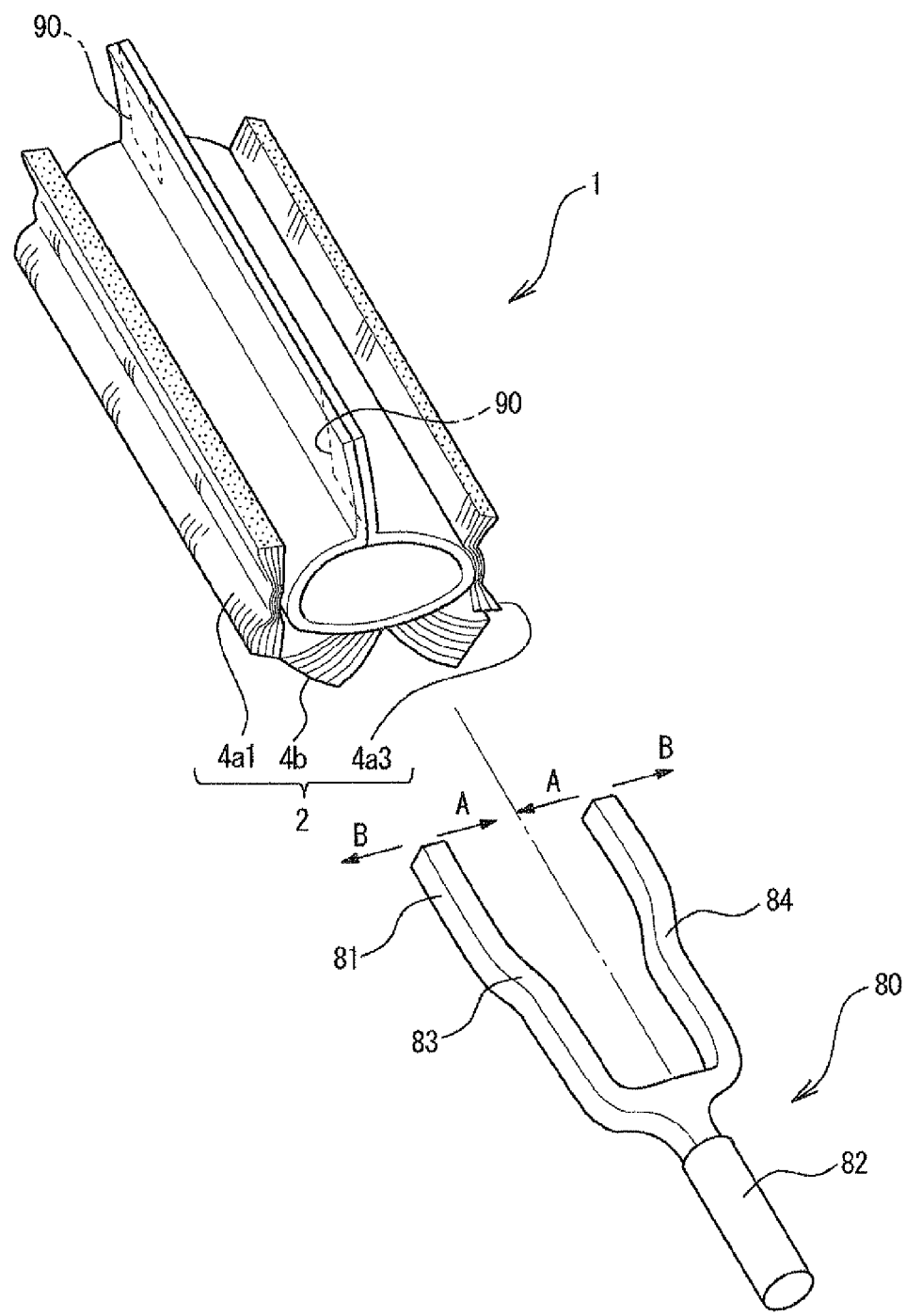
FIG. 12 is a perspective view for depicting a second embodiment of a second cleaning tool using a cleaning sheet of the present invention.

When the cleaning sheet 1 having the fixing portion forming portions 16 is used, the cleaning sheet 1 can be set to a grasping handle 80 as shown in the following to form a cleaning handy mop as indicated in FIG. 12 (referred to as a second embodiment of the cleaning tool).

The grasping handle 80 is constituted by supporter rods 83, 84 constituting a fixing portion 81 that elastically extends in a spring-like fashion in the B direction to fix the cleaning sheet 1 and a grip portion 82.

Upon fitting the grasping handle 80 with the cleaning sheet 1, one edge side of the cleaning sheet 1 is turned up to the other edge side to overlay the sides on each other, with the cleaning portion 2 being directed outward. Consequently, the fixing portions 90, 90 are formed in a region in which the fixing portion forming portion 16 is formed, and the cleaning sheet 1 is kept in a cylinder-like fashion (FIG. 12).

The opening width of the arrow A-B direction of an opening 85 of the cylindrical cleaning sheet 1 can be set as appropriate depending on the position at which the fixing portion forming portion 16 is formed. The cylindrical cleaning sheet 1 is preferably formed such that the opening width when the cylindrical cleaning sheet 1 is stretched in the arrow B direction is narrower than the interval between the supporter rods 83, 84 disposed in the grasping handle 80. Such a constitution narrows the interval between the supporter rods 83, 84 in the arrow A direction, when the supporter rods 83, are inserted into the opening portion 85. After the supporter rods 83, 84 are inserted into the opening portion 85, a force outward by the restoring force of the supporter rods 83, 84 (an action force in the B direction) is exerted to definitely hold the supporter rods 83, 84 inside the cylindrical cleaning sheet 1 and not to readily detach the cleaning sheet 1 from the grasping handle 80 during cleaning.

The cleaning handy mop using the cleaning sheet 1, in addition to one shown in FIG. 12, may be a mop produced by making the cleaning sheet 1 cylindrical, forming the opening portion 85 in the flow direction of the fibers constituting the fiber bound material 4 of the cleaning portion 2 and then inserting the grasping handle 80 into the opening portion 85 (referred to as a third cleaning tool).

Figure 13:
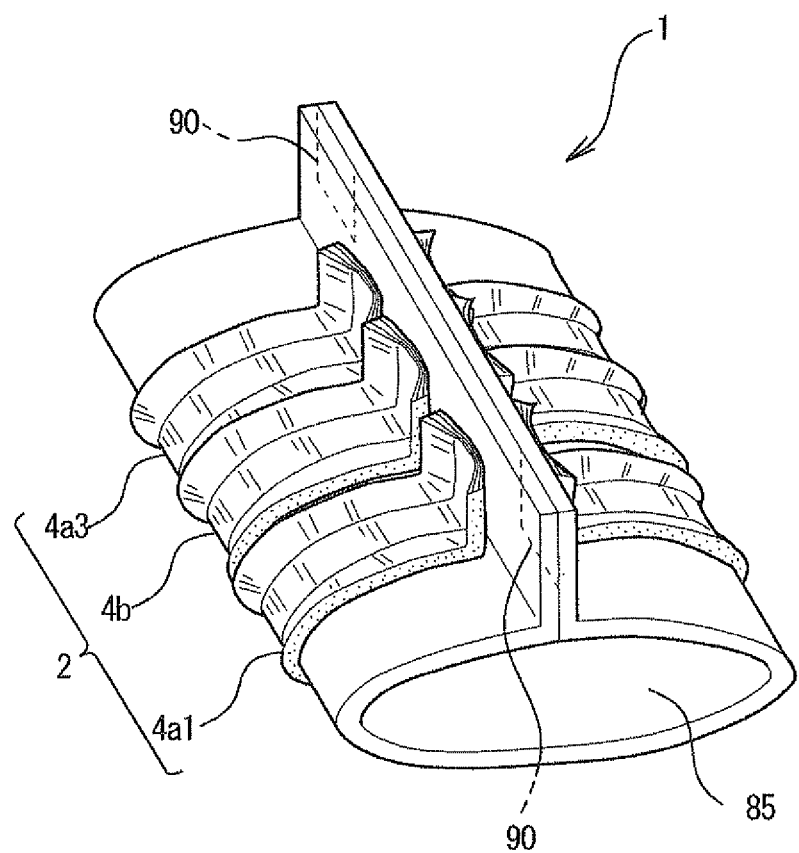
FIG. 13 is a perspective view for depicting a third embodiment of a third cleaning tool using a cleaning sheet of the present invention.

The cylindrical cleaning sheet 1 used in the cleaning handy mop can be obtained by turning the cleaning sheet 1 up in the flow direction of the fibers of the fiber bound material 4, with the cleaning portion 2 being directed outward, and overlaying the cleaning sheet on each other to form the fixing portions 90, 90 in the region of forming the fixing portion forming portion 16 in a third embodiment of the cleaning tool (FIG. 13).

Figure 19:
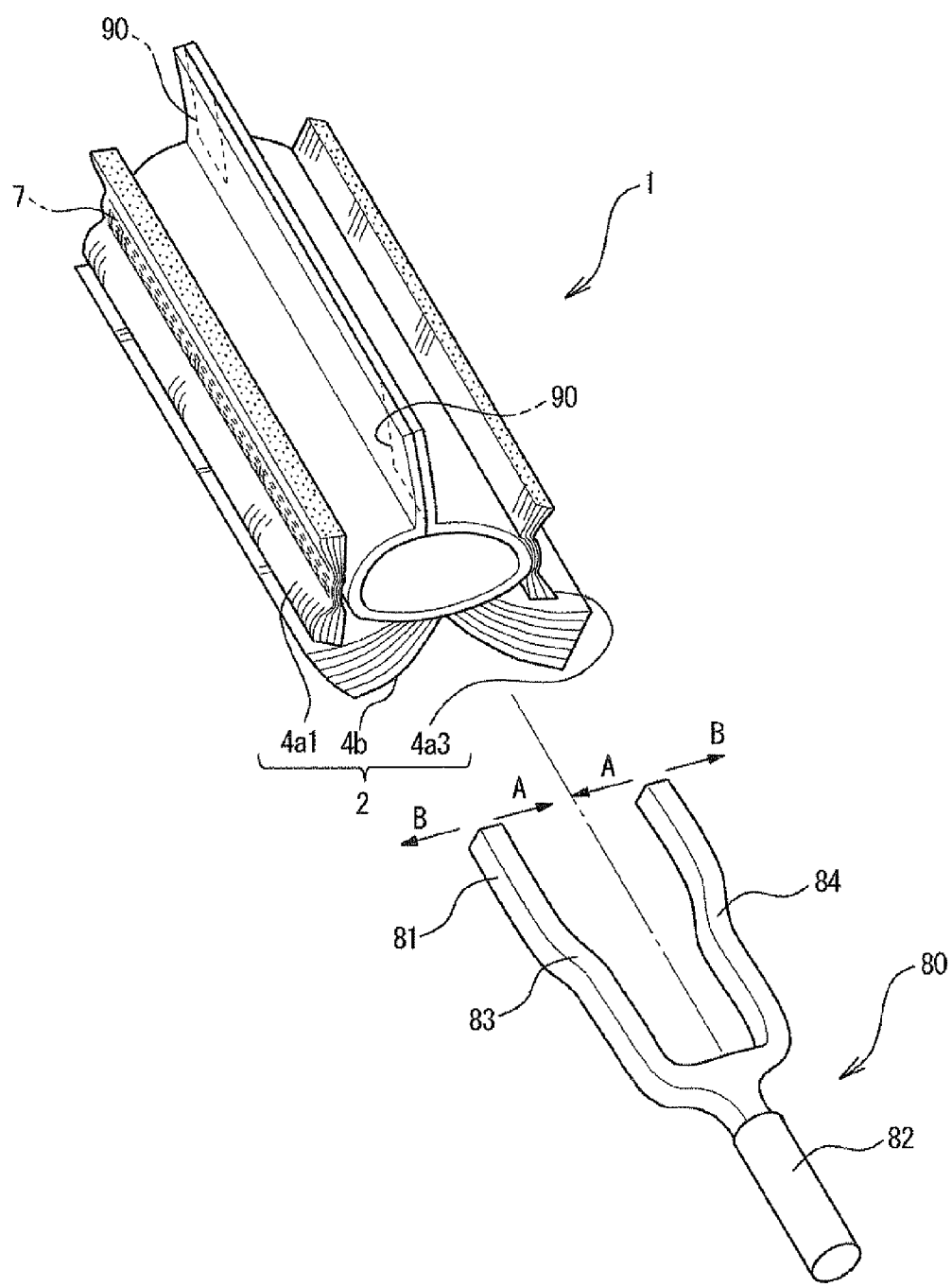
FIG. 19 is a perspective view for depicting an embodiment similar to the embodiment shown in FIG. 12.

As shown in FIG. 19, the sets of plural fiber bound materials are disposed on the base sheet to align rows of the fiber bound materials in parallel with a longitudinal axis of the cylindrical base sheet 11. A length of a movable portion extending from the fixing portion or a bound portion to a free end of one of sets of plural fiber bound materials 4a1, 4b and 4a3 is different from a length of a movable portion extending from the bound portion to a free end of another of the sets of plural fiber bound materials disposed adjacently to the one of the sets of plural fiber bound materials 4, and the free ends of the movable portions of the adjacently disposed sets of fiber bound materials partially overlap each other.

Figure 20:
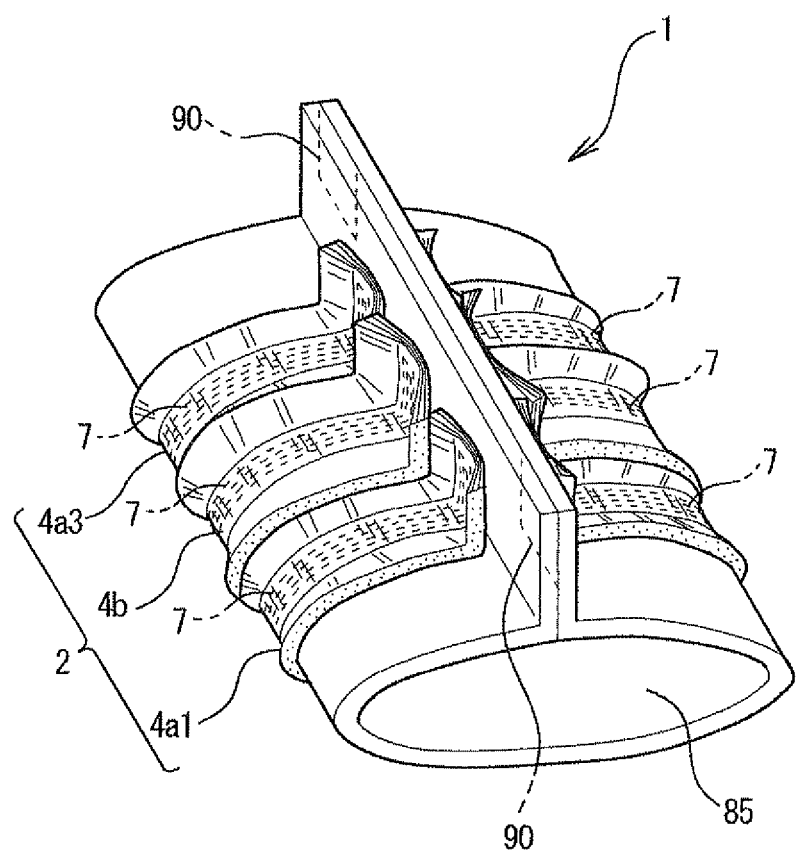
FIG. 20 is a perspective view for depicting an embodiment similar to the embodiment shown in FIG. 13.

And also, as shown in FIG. 20, the sets of plural fiber bound materials are disposed on the base sheet to align rows of the fiber bound materials in parallel with a diameter direction of the cylindrical base sheet 11. A length of a movable portion extending from the fixing portion or a bound portion to a free end of one of sets of plural fiber bound materials 4a1, 4b and 4a3 is different from a length of a movable portion extending from the bound portion to a free end of another of the sets of plural fiber bound materials disposed adjacently to the one of the sets of plural fiber bound materials 4, and the free ends of the movable portions of the adjacently disposed sets of fiber bound materials partially overlap each other.

Although FIG. 10 indicates the case where the cleaning sheet 1 has the fixing portion forming portions 16 disposed in four portions, the number of the disposition portions of the fixing portion forming portions 16 is not limited thereto. If the cylindrical cleaning sheet 1 can be formed, the fixing portion forming portions 16 may be disposed only in one portion, or may be disposed in five or more portions in positions outside the region G-H in FIG. 10.

The fixing portion forming portion 16 can use a material similar to an adhesive material used in the adhesion portion 15. For the adhesive material used in the fixing portion forming portion 16, a peelable adhesive material may be used. The use of the material readily enables the repetition of the formation and release of the fixing portion 90.

Upon the formation of the fixing portion forming portion 16, a method of disposing the fixing portion forming portion with a double coated tape or the like as in the adhesion portion 15 may be used.

As the fixing portion forming portion 16, in addition to the use of the above-mentioned adhesive material, a material may be used in which the fixing portion forming portions (16a, 16b) (16c, 16d) are formed opposite to each other when the cleaning sheet 1 is made cylindrical and are overlaid on each other to form fixing portions. The specific examples include hook and loop tapes of Velcro (Trademark)

Velcro (Trademark) is provided with the hook tape having a lot of hook-like extrusions formed on a surface of the tape and the loop tape having a lot of loops formed on the tape. Overlaying the hook tape and the loop tape bring strong binding effects on a fixing portion. In the case where such Velcro (Trademark) is used in the fixing portion forming portion 16, for example, the cleaning sheet 1 is produced such that a combination of each of the hook tape and the loop tape is disposed to correspond to a combination of the fixing portion forming portions (16c, 16d), respectively. The fixing portion forming portions (16c, 16d) are disposed to correspond to a combination of the two strips of the hook-like substrate sheet strip and the pile-like substrate sheet strip. When the cleaning sheet 1 is turned up as described above and made cylindrical, a fixing portion in the case where a combination of the fixing portion forming portions (16a, 16b) is overlaid on a combination of the fixing portion forming portions (16c, 16d), respectively. Therefore, according to the cleaning sheet 1, a fixing portion can be formed so as to be localized in a specified position.

Where the fixing portion forming portion 16 is disposed in the cleaning sheet 1 and Velcro (Trademark) is used as its fixing portion forming portion 16, the fixing portion (16a, 16d) and the fixing portion (16b, 16c) are preferably made to correspond to either of the hook tape and the loop, respectively.

According to the cleaning sheet 1, the fixing portion 16b, 16d can be respectively opposed to and overlaid on the fixing portion 16a, 16c parallel with the axis of the frame to form a fixing portion and make the cleaning sheet cylindrical. The fixing portion 16c, 16d are respectively opposed to and overlaid on the fixing portion 16a, 16b in the crosswise direction with the axis of the frame to be also capable of making the cleaning sheet cylindrical and obtaining both of the second and third cleaning tools.

Upon the description of the cleaning tools (the first, second and third tools) by use of the cleaning sheet 1 of the present invention, the case where a cleaning tool in which the cleaning portion 2 is formed on one face of the base sheet 3 as the cleaning sheet 1 is used has been set forth, but the cleaning tool is not limited thereto. A cleaning tool may be constituted by use of the cleaning sheet 1 (e.g., the cleaning sheet shown in FIG. 6A and FIG. 6B) having the cleaning portions 2 formed on both the faces of the base sheet 3.

In this manner, the formation of the cleaning portion 2 on both the faces of the base sheet 3 in the cleaning sheet 1 makes it possible to use both the faces of the cleaning sheet 1 for cleaning.

With the cleaning sheet 1, the adhesion portion 15 may be formed on both the faces of the base sheet 3, and further perforations may be produced around each of the adhesion portions 15, and provides the following advantage. That is, when dirt is twined and taken off by use of the cleaning portion 2 disposed on one face of the base sheet 3 and further hard, heavy, large dust particles and the like are affixed using the adhesion portion 15, and then cleaning is performed using the cleaning portion 2 disposed on the other side of the base sheet 3, it is possible to cut off the adhesion portion 15 to which hard dust particles adhere from the base sheet 3. This results in reduction in the possibility that hard dust particles affixed to the face of the adhesion portion make contact with matters to be cleaned and the like and hurt the adhesion portion during cleaning.

In the cleaning sheet 1 as well, the base sheet 3 may be provided with the fixing portion forming portion 16 and in particular the fixing portion forming portion 16 is preferably disposed on both sides of the base sheet 3. Moreover, it is possible to use both sides of the base sheet 3 for cleaning even in the case where the cleaning sheet 1 is used as the second and third cleaning tools as described above.

The cleaning tool using the cleaning sheet 1 having the cleaning portion 2 formed on both sides of base sheet 3 has the following advantage. In some cases, the cleaning portion 2 formed on one side (first face) of the base sheet 3 makes contact with a hand, the grasping handle 80 of a cleaning tool or the frame 70 of a floor cleaning mop, and the cleaning portion 2 formed on the other side (second face) of the base sheet 3 makes contact with a matter to be cleaned in order to perform cleaning. In such cases, the cleaning portion 2 on the first face making contact therewith can serve as a cushion absorbing lips and dips even if a few lips and dips are present in a hand, the grasping handle 80 and the frame 70. This allows more sufficient contact between the cleaning portion 2 on the second face and a matter to be cleaned.

In the case where the cleaning sheet 1 is disposed to make contact with only one side (first face) of the base sheet 3 and the cleaning portion 2 is not disposed on the other side (second face) of the base sheet 3, a bag having a hand-insertable opening on the second face of the third sheet 3 may be detachably disposed in the cleaning sheet 1.

The cleaning sheet 1 may have an adhesion portion such as a double coated tape disposed on the second face of the base sheet 3. In this case, the grasping handle 80 and the cleaning sheet 1 can be immobilized by pressing the grasping handle 80 as indicated in the second cleaning tool against the adhesion portion disposed on the second face of the base sheet 3.

The cleaning sheet 1 may have either of the hook tape and the loop tape disposed on the second face of the base sheet 3. Either of the hook tape and the loop corresponding thereto may be disposed in the grasping handle 80 as indicated in the second cleaning tool, whereby the cleaning sheet 1 may be detachably bound to the grasping handle 80 via Velcro (Trademark). For example, the hook tape may be disposed on the second face of the base sheet 3 and the loop tape may be disposed in the grasping handle 80. With this configuration, the loop tape of the grasping handle 80 is pressed against the hook tape disposed on the second face of the base sheet 3. As a consequently, a fixing portion is formed with the loop of the grasping handle 80 and hook tape of the cleaning sheet 1, so that the grasping handle 80 and the cleaning sheet 1 are immobilized.

Figure 21:
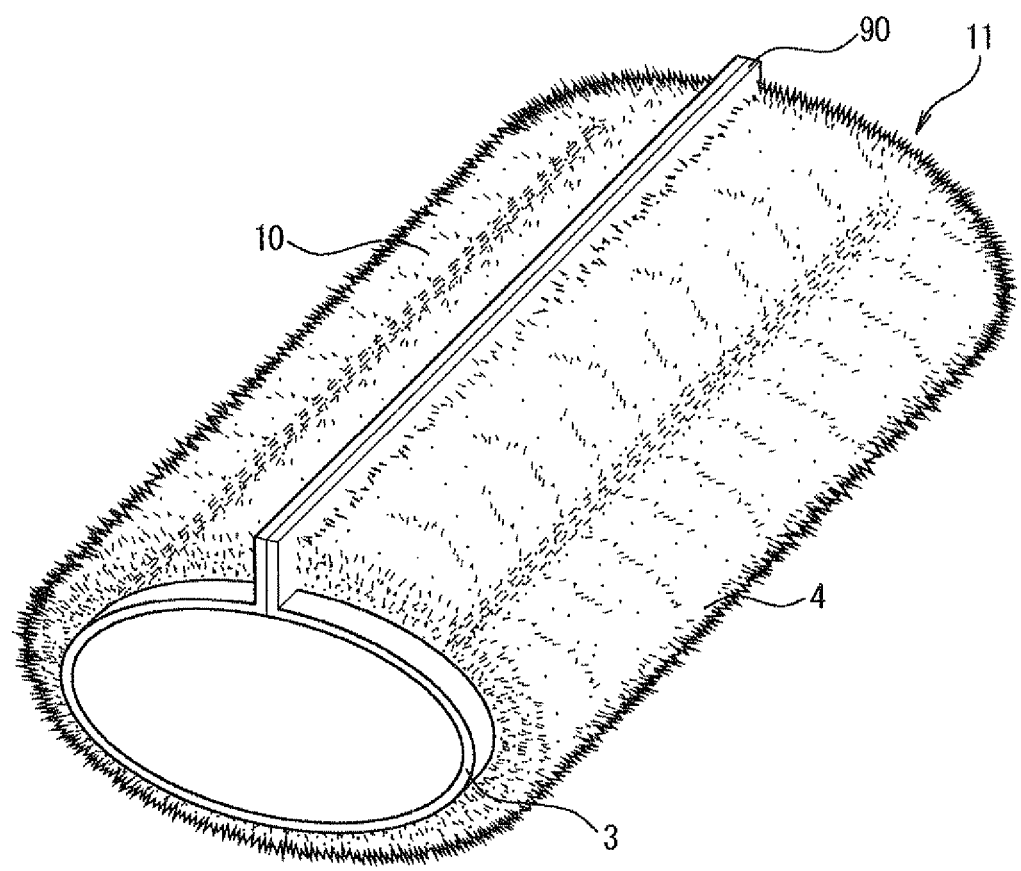
FIG. 21 is a perspective view for depicting an embodiment of a cylindrical cleaning sheet conducted an air-blowing treatment on the embodiments shown in FIGS. 12 and 19, by which the fibers thereof are raised.

FIG. 21 shows a perspective view of an embodiment of a cylindrical cleaning sheet which is conducted an air-blowing treatment on the embodiments shown in FIGS. 12 and 19. In accordance with the air-blowing treatment on the cylindrical cleaning sheet 11, the fibers of the fiber bound materials 4 are raised or napped by the air or gas blown thereto, and air blown and raised fibers 10 are provided on the cylindrical cleaning sheet 11.

Figure 22:
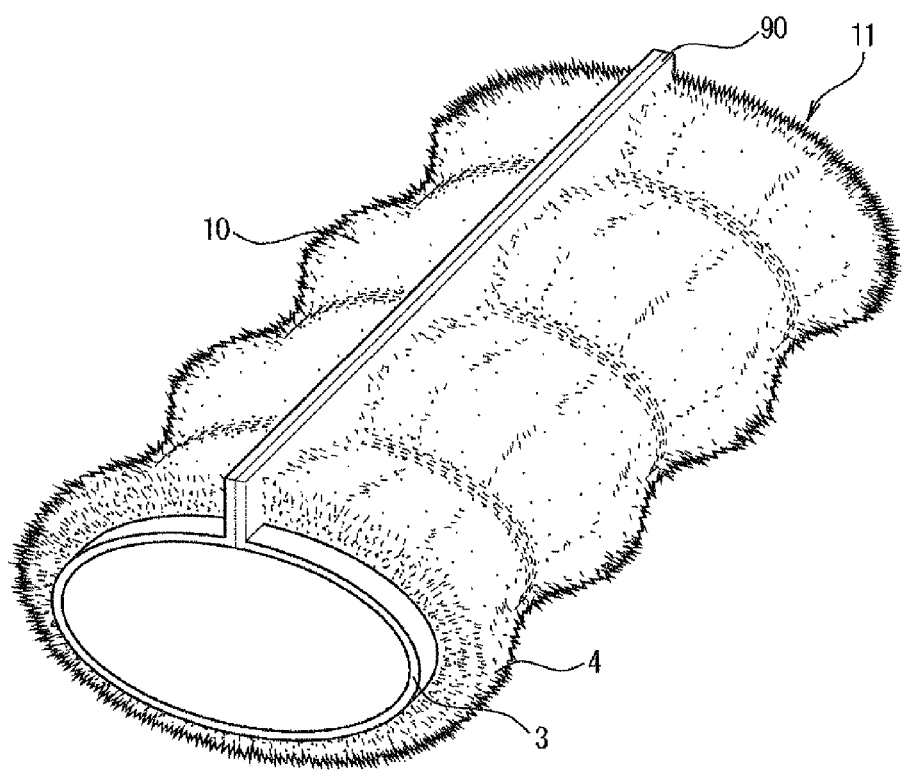
FIG. 22 is a perspective view for depicting an embodiment of a cylindrical cleaning sheet conducted an air-blowing treatment on the embodiments shown in FIGS. 13 and 20, by which the fibers thereof are raised.

FIG. 22 shows a perspective view of an embodiment of a cylindrical cleaning sheet 11 which is conducted an air-blowing treatment on the embodiments shown in FIGS. 13 and 20. In accordance with the air-blowing treatment on the cylindrical cleaning sheet 11, as the same manner described as above and shown in FIG. 21, the fibers of the fiber bound materials 2 are raised or napped by the air or gas blown thereto, and air blown and raised fibers 10 are provided on the cylindrical cleaning sheet 11

Figure 23:
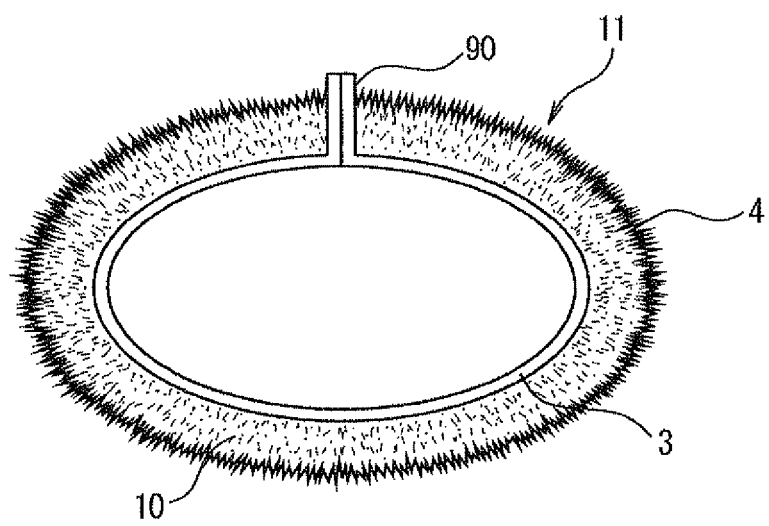
FIG. 23 is a sectional view of the embodiment shown in FIG. 21.

FIG. 23 is a sectional view of the embodiment shown in FIG. 21. On the base sheet 3 which is cylindrically formed by connected at the binding portions 90 of both the side end portions, the fibers 10 of the cylindrically formed fiber bound materials 4 of the cylindrical cleaning sheet 11 are raised or napped by the air or gas blown thereto.

The present invention is useful for use in house and home as a cleaning tool for removing dirt affixed to furniture such as wardrobes, electric appliances such as personal computers and lights, walls inside building, thresholds, and head jamb.

What is claimed is:

1. A cleaning sheet comprising:
a base sheet; and
a plurality of sets of plural fiber bound materials, each of the sets of fiber bound materials is comprised of fibers which are aligned in a first direction and are bound at a center portion thereof along a second direction crossing the first direction of fibers,
wherein: the sets of plural fiber bound materials are adjacently disposed side-by-side and each set is joined at its bound portion on at least one surface of the base sheet to form a joining portion
the adjacently disposed respective sets of plural fiber bound materials have respectively differing densities of the fibers thereof;
a length of a movable portion extending from the bound portion to a free end of one of the sets of plural fiber bound materials is different from a length of a movable portion extending from the bound portion to a free end of another of the sets of plural fiber bound materials disposed adjacently to the one of the sets of plural fiber bound materials; and
the free ends of the movable portions of the adjacently disposed sets of fiber bound materials partially overlap each other.

2. The cleaning sheet according to claim 1, wherein one of the sets of plural fiber bound materials which has a comparatively high density of fibers and is bulky, is disposed at a vicinity of a central portion on the base sheet, and fiber bound material of another of the sets of plural fiber bound materials which has comparatively low density is disposed at an outside portion of the one of the sets thereof to form overlapped bulky free ends of the movable portions thereof.

3. The cleaning sheet according to claim 1, wherein sets of plural fiber bound materials are disposed side by side and joined onto opposed surfaces of the base sheet.

4. The cleaning sheet according to claim 1, further comprising a substrate sheet being disposed and fixed between at least one of the sets of plural fiber bound materials and the base sheet to constitute a cleaning portion together with the at least one of the sets of plural fiber bound materials and the substrate sheet.

5. The cleaning sheet according to claim 1, wherein the base sheet is comprised of two base sheets joined at opposite side portions thereof, and the sets of plural fiber bound materials are adjacently disposed side-by-side and each set is joined at its bound portion on at least one surface of the base sheet to form a joining portion, and a holding portion is formed in an inner portion defined by inner surfaces of the joined two sheets.

6. The cleaning sheet according to claim 5, wherein the sets of plural fiber bound materials are adjacently disposed side-by-side and each set is joined at its bound portion on both outer surfaces of the two base sheets.

7. The cleaning sheet according to claim 1, further comprising a frame and a handle being attached to the frame, wherein the base sheet on which is mounted the plurality of sets of plural fiber bound materials is fitted on the frame.

8. The cleaning sheet according to claim 7, wherein the base sheet surrounds a surface of the frame to outwardly dispose the sets of plural fiber bound materials in parallel with a longitudinal axis of the frame.

9. The cleaning sheet according to claim 7, wherein the base sheet surrounds a surface of the frame to outwardly dispose the sets of plural fiber bound materials in parallel with a lateral axis of the frame.

10. The cleaning sheet according to claim 1, wherein the base sheet on which the plurality of sets of plural fiber bound materials is joined is cylindrically formed to outwardly dispose the set of plural fiber bound material and to have at least one opening at a side portion thereof.

11. The cleaning sheet according to claim 10, wherein the sets of plural fiber bound materials are disposed on the base sheet to align rows of the fiber bound materials in parallel with a longitudinal axis of the cylindrical base sheet.

12. The cleaning sheet according to claim 11, wherein the fibers of the plurality of sets of plural fiber bound materials joined on the cylindrical base sheet is raised by blowing an air thereto with a treatment of an air-blowing system.

13. The cleaning sheet according to claim 10, wherein the sets of plural fiber bound materials are disposed on the base sheet to align rows of the fiber bound materials in parallel with a diameter direction of the cylindrical base sheet.

14. The cleaning sheet according to claim 13, wherein the fibers of the plurality of sets of plural fiber bound materials joined on the cylindrical base sheet is raised by blowing an air thereto with a treatment of an air-blowing system.

15. The cleaning sheet according to claim 10, further comprising a handle being insertable into the opening of the cylindrical base sheet, wherein the base sheet provided with the plurality of sets of plural fiber bound materials is fitted on the handle.

16. A cleaning sheet comprising:
a base sheet;
a plurality of sets of plural fiber bound materials being disposed on at least one surface of the base sheet and joined side-by-side to form a plurality of rows on the base sheet; and
a substrate sheet being disposed and fixed between at least one of the sets of plural fiber bound materials and the base sheet;
wherein: at least two adjacently disposed sets of plural fiber bound materials have respectively different lengths in a longitudinal direction of fibers thereof;
free ends of the adjacent sets of plural fiber bound materials partially overlap each other; and
the substrate sheet covers partially at least one of the sets of plural fiber bound materials along a row thereof to form a cleaning portion together with the at least one of the sets of plural fiber bound materials and to prevent twining of the fibers of the adjacent sets of plural fiber bound materials.

17. The cleaning sheet according to claim 16, wherein each of the sets of plural fiber bound materials is bent at a bent portion adjacent to the bound portion after alignment of the fibers, the bent portion being located along a direction crossing a first direction.

18. A cleaning sheet comprising:
a base sheet; and
a plurality of sets of plural fiber bound materials being disposed on at least one surface of the base sheet and joined side-by-side to form a plurality of rows on the base sheet;

wherein:
at least two adjacently disposed sets of plural fiber bound materials have respectively different lengths in a longitudinal direction of fibers thereof;
one of the sets of plural fiber bound materials which has a comparatively high density of fibers and is bulky, is disposed at a vicinity of a central portion on the base sheet, and fiber bound material of another of the sets of plural fiber bound materials which has comparatively low density is disposed at an outside portion of the one of the sets thereof to form overlapped bulky free ends of movable portions thereof, and
free ends of the adjacent sets of plural fiber bound materials partially overlap each other.

19. The cleaning sheet according to claim 18, wherein the base sheet on which the plurality of sets of plural fiber bound materials is joined is cylindrically formed to outwardly dispose the set of plural fiber bound material and to have at least one opening at a side portion thereof.

20. The cleaning sheet according to claim 19 wherein the sets of plural fiber bound materials are disposed on the base sheet to align rows of the fiber bound materials in parallel with a longitudinal axis of the cylindrical base sheet.

21. The cleaning sheet according to claim 19, wherein the sets of plural fiber bound materials are disposed on the base sheet to align rows of the fiber bound materials in parallel with a diameter direction of the cylindrical base sheet.

22. The cleaning sheet according to claim 19, further comprising a handle being insertable into the opening of the cylindrical base sheet, wherein the base sheet provided with the plurality of sets of plural fiber bound materials is fitted on the handle.

23. The cleaning sheet according to claim 19, wherein the fibers of the plurality of sets of plural fiber bound materials joined on the cylindrical base sheet is raised by blowing an air thereto with a treatment of an air-blowing system.

24. A cleaning sheet comprising:
a base sheet; and
a plurality of sets of plural fiber bound materials, each of the sets of fiber bound materials is comprised of fibers which are aligned in a first direction and are bound at a center portion thereof along a second direction crossing the first direction of fibers; and
a plurality of substrate sheets, and each of the substrate sheets being disposed and fixed between each of the sets of plural fiber bound materials and the base sheet, and the each substrate sheet covers partially at least the each of sets of plural fiber bound materials along a row thereof to constitute a cleaning portion together with the set of plural fiber bound materials and the substrate sheet,
wherein the plurality of sets of plural fiber bound materials are disposed side-by-side and the each of the sets of plural fiber bound materials is joined at its bound portion on one surface of the each of the substrate sheets, and an opposite surface of the each of the substrate sheets is joined on the base sheet at a corresponding portion of the bound portion of the each of sets of plural fiber bound material, and a length of a movable portion of the sets of plural fiber bound materials extends from the bound portion to a free end of one of the sets of plural fiber bound materials.

25. The cleaning sheet according to claim 24, wherein the each of the substrate sheets covers entirely the each of the sets of plural fiber bound materials along the row thereof and along the first direction of the fibers.

26. The cleaning sheet according to claim 24, further comprising a frame and a handle being attached to the frame, wherein the base sheet on which is mounted the plurality of sets of plural fiber bound materials is fitted on the frame.

27. The cleaning sheet according to claim 26, wherein the base sheet surrounds a surface of the frame to outwardly dispose the sets of plural fiber bound materials in parallel with a longitudinal axis of the frame.

28. The cleaning sheet according to claim 26, wherein the base sheet surrounds a surface of the frame to outwardly dispose the sets of plural fiber bound materials in parallel with a lateral axis of the frame.

29. The cleaning sheet according to claim 24, wherein the base sheet on which the plurality of sets of plural fiber bound materials is joined is cylindrically formed to outwardly dispose the set of plural fiber bound material and to have at least one opening at a side portion thereof.

30. The cleaning sheet according to claim 29, wherein the sets of plural fiber bound materials are disposed on the base sheet to align rows of the fiber bound materials in parallel with a longitudinal axis of the cylindrical base sheet.

31. The cleaning sheet according to claim 30, wherein the fibers of the plurality of sets of plural fiber bound materials joined on the cylindrical base sheet is raised by blowing an air thereto with a treatment of an air-blowing system.

32. The cleaning sheet according to claim 29, wherein the sets of plural fiber bound materials are disposed on the base sheet to align rows of the fiber bound materials in parallel with a diameter direction of the cylindrical base sheet.

33. The cleaning sheet according to claim 32, wherein the fibers of the plurality of sets of plural fiber bound materials joined on the cylindrical base sheet is raised by blowing an air thereto with a treatment of an air-blowing system.

34. The cleaning sheet according to claim 29, further comprising a handle being insertable into the opening of the cylindrical base sheet, wherein the base sheet provided with the plurality of sets of plural fiber bound materials is fitted on the handle.

35. The cleaning sheet according to claim 24, wherein the opposite surface of the each of the substrate sheets is partially joined on the base sheet in a line of spot-form at a corresponding portion of the bound portion of the each of sets of plural fiber bound material.

36. The cleaning sheet according to claim 24, wherein the opposite surface of the each of the substrate sheets is joined to extend linearly on the base sheet at a corresponding portion of the bound portion of the each of sets of plural fiber bound material.

37. The cleaning sheet according to claim 24, wherein and an opposite surface of the each of the substrate sheets is intermittently joined on the base sheet at a corresponding portion of the bound portion of the each of sets of plural fiber bound material.

38. The cleaning sheet according to claim 24, wherein the opposite surface of the each of the substrate sheets is entirely joined on the base sheet at a corresponding portion of the bound portion of the each of sets of plural fiber bound material.

* * * * *